(12) United States Patent
Tan

(10) Patent No.: US 8,498,519 B2
(45) Date of Patent: Jul. 30, 2013

(54) COPY PROTECTION METHOD AND APPARATUS

(75) Inventor: Baolin Tan, Cambs (GB)

(73) Assignee: DCS Copy Protection Ltd., West Yorkshire (GB)

( * ) Notice: Subject to any disclaimer, the term of this patent is extended or adjusted under 35 U.S.C. 154(b) by 951 days.

(21) Appl. No.: 11/988,081

(22) PCT Filed: Jun. 27, 2006

(86) PCT No.: PCT/GB2006/002358
§ 371 (c)(1),
(2), (4) Date: Feb. 2, 2009

(87) PCT Pub. No.: WO2007/000585
PCT Pub. Date: Jan. 4, 2007

(65) Prior Publication Data
US 2009/0202215 A1    Aug. 13, 2009

(30) Foreign Application Priority Data
Jun. 27, 2005    (GB) .................................. 0513051.3

(51) Int. Cl.
*H04N 9/79* (2006.01)
*H04N 5/91* (2006.01)

(52) U.S. Cl.
USPC ........................................................ 386/252

(58) Field of Classification Search
None
See application file for complete search history.

(56) References Cited

U.S. PATENT DOCUMENTS

| | | | |
|---|---|---|---|
| 4,163,253 A | 7/1979 | Morio et al. | |
| 4,577,216 A | 3/1986 | Ryan | |
| 4,626,890 A | 12/1986 | Ryan | |
| 5,229,735 A * | 7/1993 | Quan | ........................ 331/116 R |
| 5,251,041 A | 10/1993 | Young et al. | |
| 5,585,929 A | 12/1996 | Young et al. | |
| 5,784,523 A | 7/1998 | Quan et al. | |
| 6,018,608 A | 1/2000 | Sakashita et al. | |

(Continued)

FOREIGN PATENT DOCUMENTS

| | | |
|---|---|---|
| EP | 0392612 | 10/1990 |
| EP | 0831648 | 3/1998 |

(Continued)

OTHER PUBLICATIONS

International Search Report and Written Opinion dated Mar. 20, 2008.

(Continued)

*Primary Examiner* — Thai Tran
*Assistant Examiner* — Sunghyoun Park
(74) *Attorney, Agent, or Firm* — Ingrassia Fisher & Lorenz, P.C.

(57) ABSTRACT

A copy protection method and apparatus is disclosed. Various protection signals are added to a video signal in the vicinity of the color burst part of the signal. The protection signals are selected to interfere with the frequency down conversion process in the video recorder so that the color burst cannot be recorded properly. The protection signals are chosen so that when a modified video signal containing the original video signal and the protection signals has been recorded by a video recorder, playback of the modified video signal exhibits visual artefacts that are not visible before recording of the modified signal occurred. The protection signals are also used to carry digital control information for controlling the operation of a digital recorder.

20 Claims, 21 Drawing Sheets

U.S. PATENT DOCUMENTS

| | | | |
|---|---|---|---|
| 6,035,094 A * | 3/2000 | Kori | 386/254 |
| 6,041,158 A | 3/2000 | Sato | |
| 6,064,442 A | 5/2000 | Aihara | |
| 6,222,978 B1 * | 4/2001 | Hirai | 386/254 |
| 6,327,422 B1 | 12/2001 | Quan et al. | |
| 6,473,560 B1 * | 10/2002 | Linnartz et al. | 386/304 |
| 6,516,132 B1 | 2/2003 | Wrobleski et al. | |
| 6,600,873 B1 | 7/2003 | Brill et al. | |
| 2002/0009000 A1 | 1/2002 | Goldberg et al. | |
| 2003/0049016 A1 * | 3/2003 | Wrobleski et al. | 386/94 |
| 2003/0108201 A1 | 6/2003 | Rumreich | |
| 2005/0141876 A1 | 6/2005 | Quan | |

FOREIGN PATENT DOCUMENTS

| | | |
|---|---|---|
| GB | 1571386 | 7/1980 |
| WO | WO 96/31878 | 10/1996 |
| WO | WO 99/57723 | 11/1999 |
| WO | WO 02/15557 a2 | 2/2002 |

OTHER PUBLICATIONS

Foede, W., "Video Copy Processor," Elektor Electronics, Elektor Publishers Ltd., Canterbury GB, Nov. 1, 1997, vol. 23, No. 260, pp. 28-33.

European Search Report dated Jun. 2, 2008, EP 08002037, 2 pages.

* cited by examiner

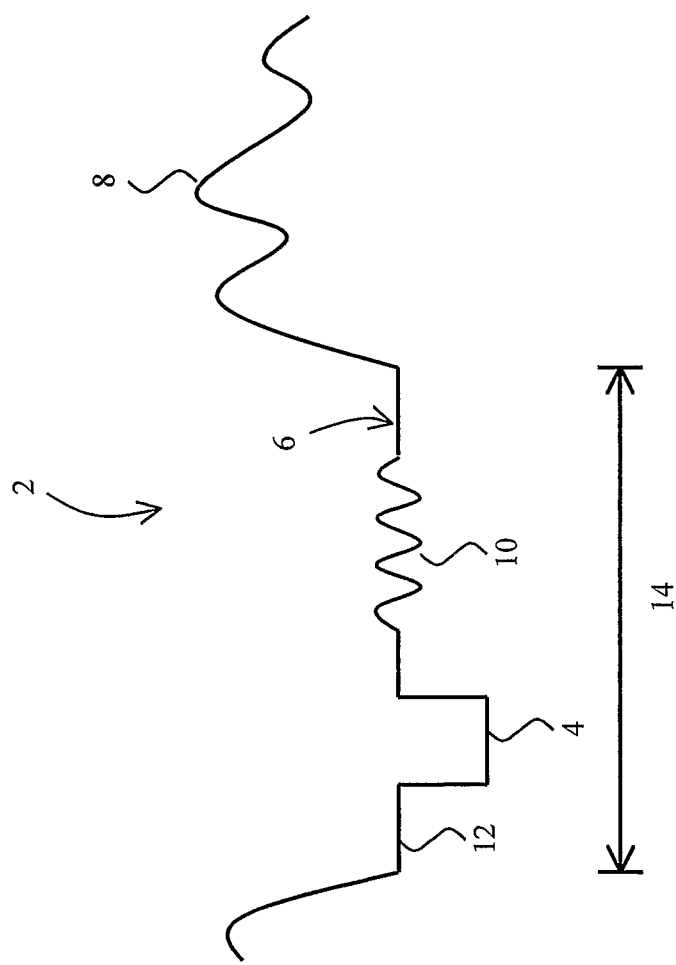

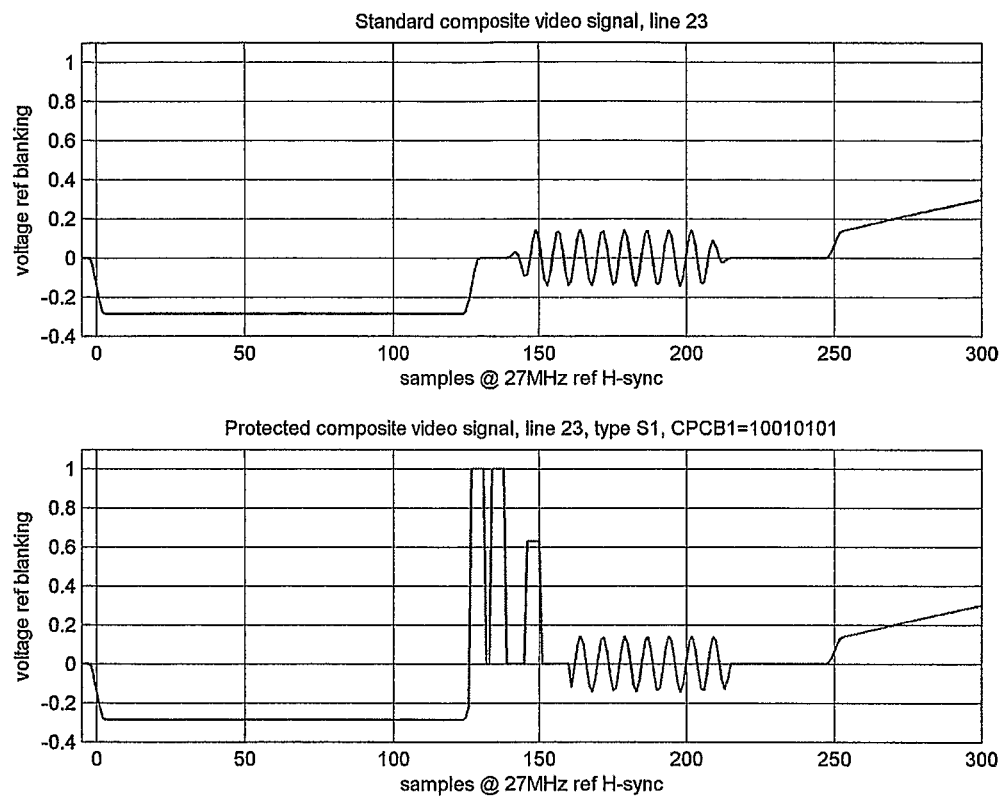
Fig 3a (top)
Fig 3b (bottom)

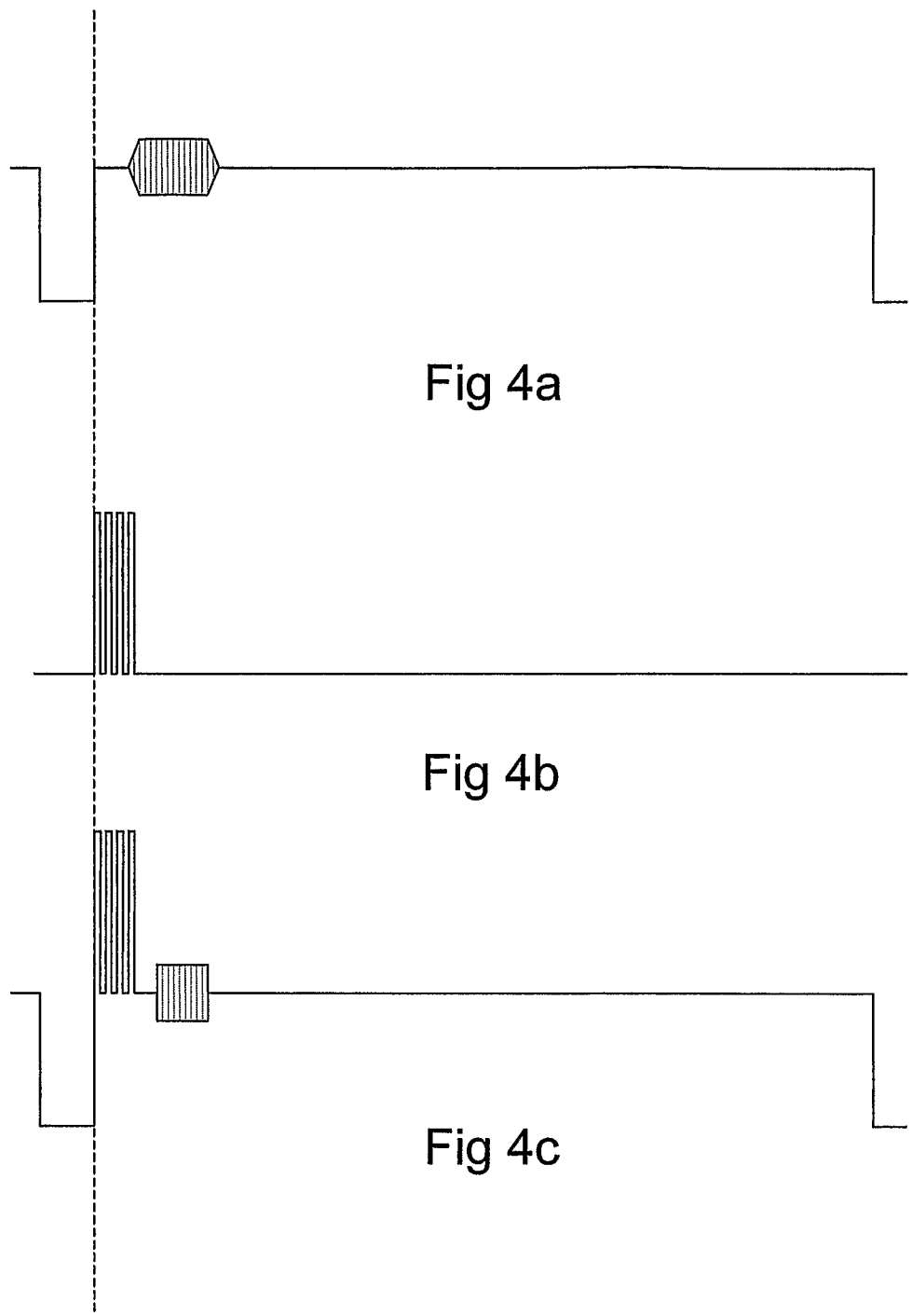

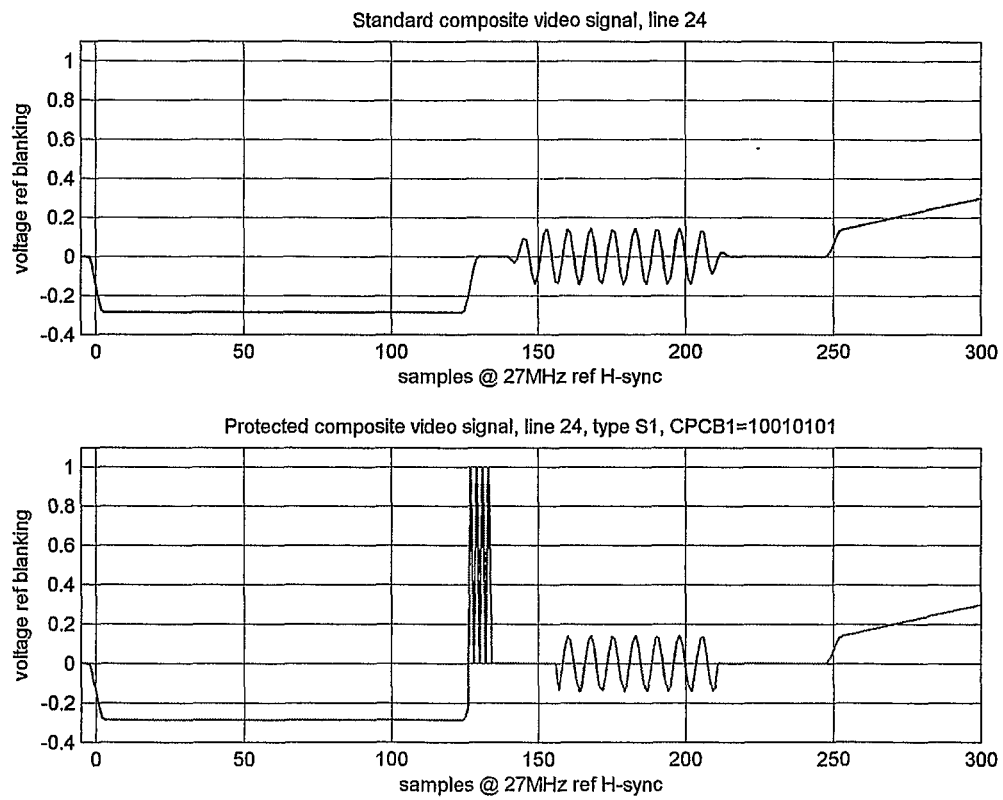
Fig 5a (top)
Fig 5b (bottom)

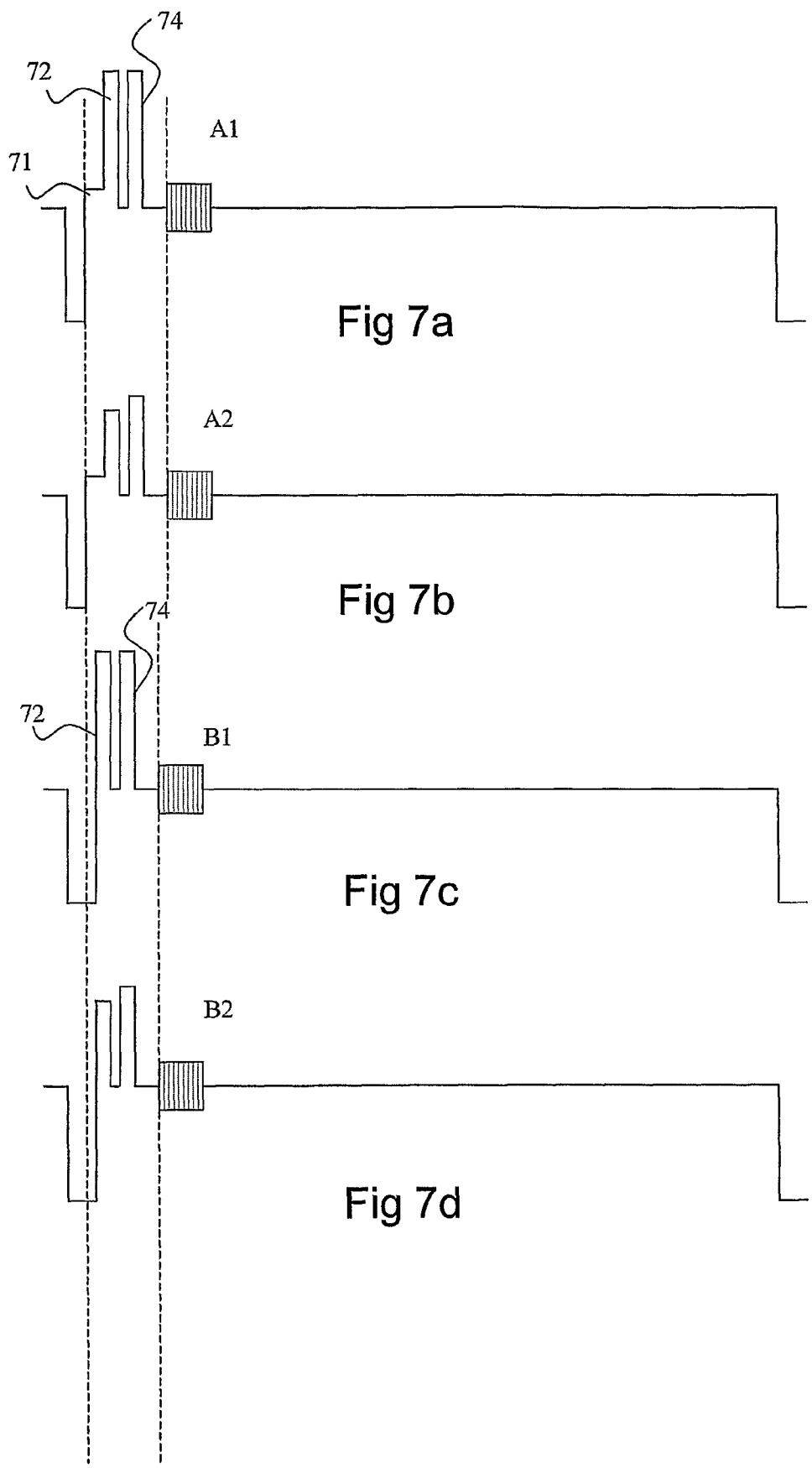

|  | Sync Pulse | Pulse #1 | | | Pulse #2 | | | Pulse #3 | | | Colour Burst | |
|---|---|---|---|---|---|---|---|---|---|---|---|---|
|  | Width | Start | Width | Amplitude | Start | Width | Amplitude | Start | Width | Amplitude | Start | Finish |
| Fig 7a: (A1): | 4.16 | 4.16 | 0.185 | 0.412V | 4.419 | 0.185 | 1V | 4.678 | 0.185 | 1V | 5.669 | 7.669 |
| Fig 7b: (A2): | 4.16 | 4.16 | 0.185 | 0.412V | 4.419 | 0.185 | 0.6V | 4.678 | 0.185 | 0.7V | 5.669 | 7.669 |
| Fig 7c: (B1): | 4.271 | 4.271 | 0.185 | 1V | 4.530 | 0.185 | 1V | N/A | | | 5.521 | 7.521 |
| Fig 7d: (B2): | 4.271 | 4.271 | 0.185 | 0.6V | 4.530 | 0.185 | 0.7V | N/A | | | 5.521 | 7.521 |

Figure 8

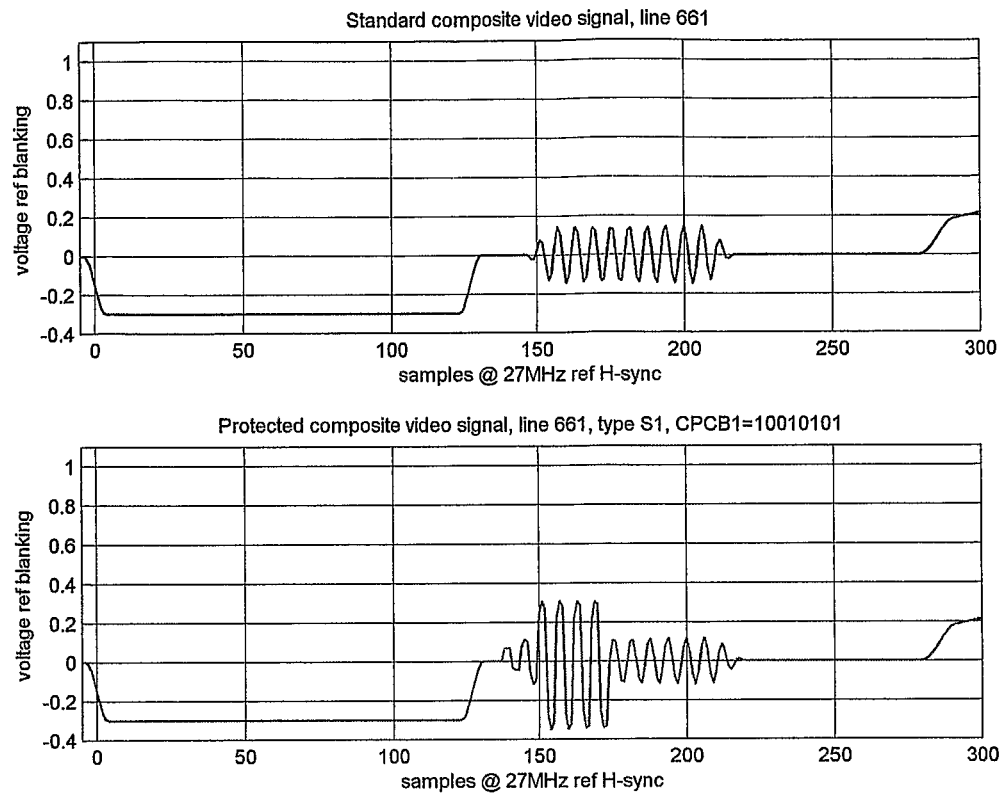
Fig 10a (top)
Fig 10b (bottom)

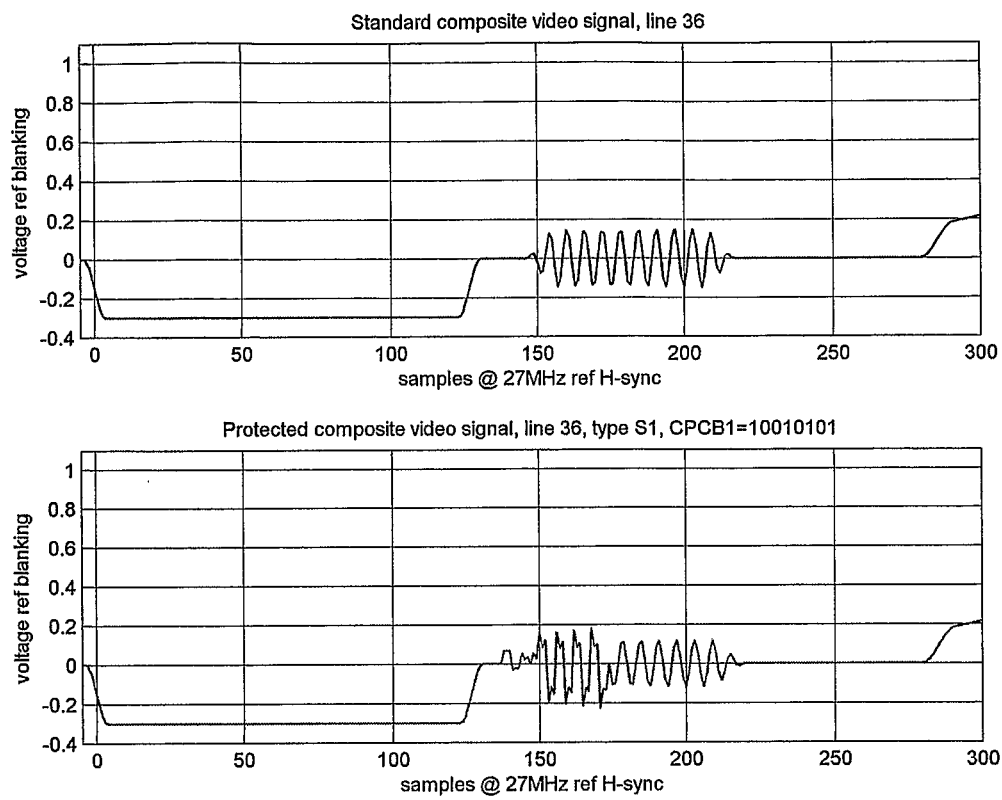
Fig 11a (top)
Fig 11b (bottom)

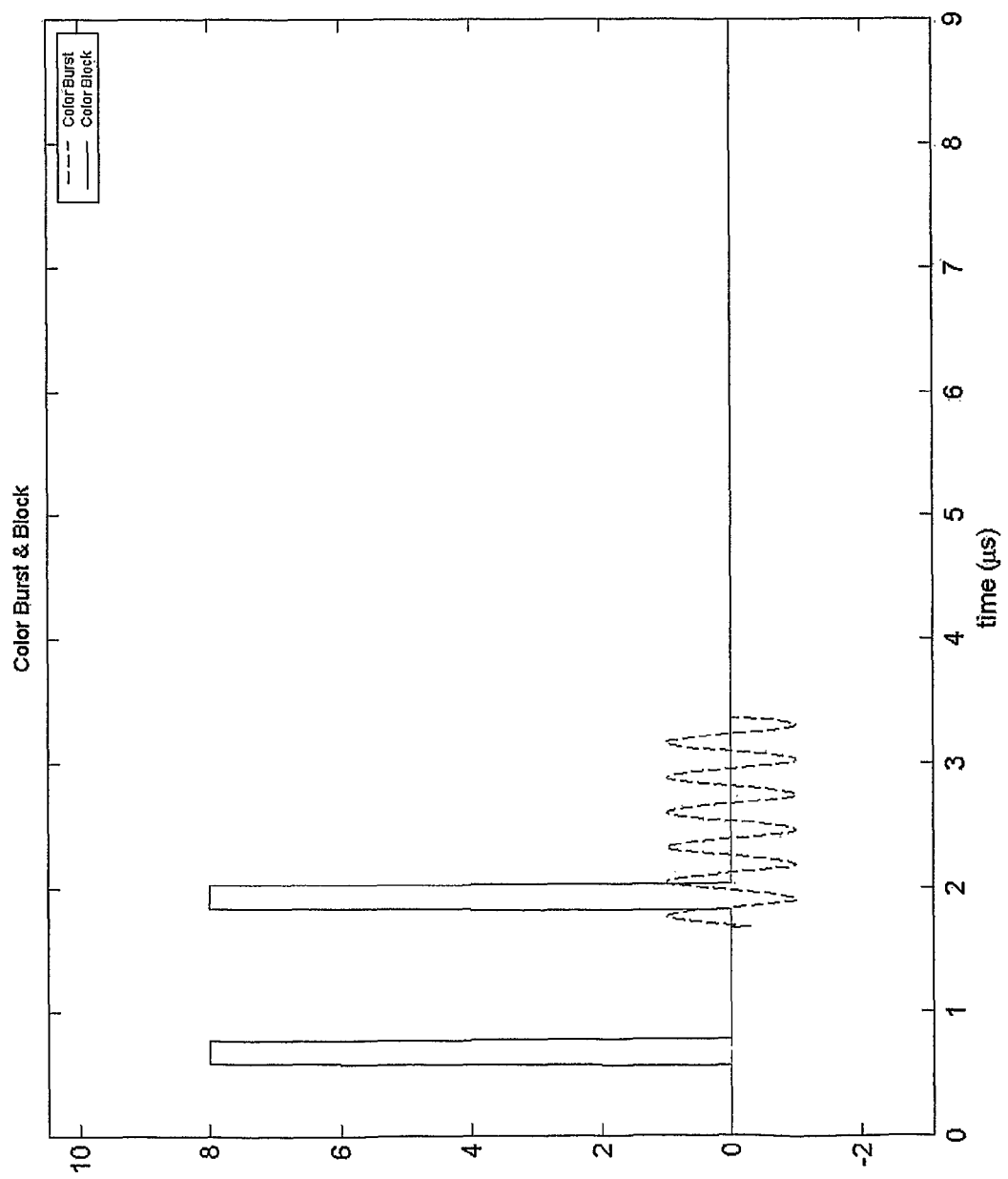

| Data bits received | Example Meaning |
|---|---|
| 1001 | Start of data sequence |
| 1011 | End of data sequence |
| 1111 | Prevent all copying |
| 0000 | None protected signal |
| 0010 | Copy only one generation only |
| 0100 | Prevent a permanent copy |
| 0110 | Copy with attached license |

Fig. 15

COPY PROTECTION METHOD AND APPARATUS

This invention relates to a method and system for modifying an analogue video signal, such that the modified signal is protected against copying, and to a digital control signal transmission method.

It is desirable for the producers of video content, such as video broadcast signals transmitted over air or cable connections, pre-recorded video cassettes, DVDs, CDs and other media, to be able to protect this content against unauthorised copying. In the case of analogue video signals, this is typically achieved by providing a video signal that is different in some way to an unprotected signal containing the standard video information and synchronisation signals for playback on a television screen or receiver. Such protected signals can be viewed ordinarily on a television receiver or other display device, but once copied exhibit visual artefacts, such as colour errors, synchronisations errors, and brightness errors, that considerably reduce the enjoyment of the viewing experience or make viewing practically impossible.

Such a signal allows broadcasters and video content producers to protect themselves against loss of revenue resulting from unauthorised copying of their signal. In the case of producers of pre-recorded video cassettes, unauthorised copying is video piracy, that is copying from one video cassette to another video cassette illegally. Often video piracy is committed with a view to selling the illegally made copies of films to the public.

In the case of broadcasters however, in particular pay-per-view TV distributors, unauthorised copying may simply be the recording of a video signal legitimately received at a digital set top box in the home onto a video cassette. Protection against this type of copying provides further advantages to the broadcasters than simply protecting against loss of revenue. By preventing unauthorised copy in the home, the broadcaster can protect the interests of the producer of the video programmes while still allowing the programme to be viewed in the home. Thus, a broadcaster may for example obtain a special agreement from a movie distributor to broadcast a movie before the movie's general video release date, allowing the broadcaster to enjoy increased rating figures, while protecting the revenue in subsequent video sales for the movie.

A number of different protection systems are known. The system described in U.S. Pat. No. 4,577,216 in the name of Ryan discloses a protection method which relies on modifying the phase of the colour burst part of an analogue video signal. The modification is designed to prevent a video recorder from successfully recording the signal, and is effective because the phase modification applied to the colour burst is mistaken by the video recorder as variations in tape velocity. To compensate for these, the video recorder generates a correction signal which is subsequently applied to the chrominance signal thereby manifesting errors in the actual picture part of the signal. A television receiver however detects the phase of the colour burst using a phase locked loop with a time constant that is longer than its counterpart in the detection circuits of the video recorder. Thus, typical television receivers are less susceptible to the variations and can still detect the reference phase in the modified signal.

Lately however, receivers have been developed having a phase locked loop with circuit elements having both long and short time constants. As a result, this method of protection has been found to cause visibility problems when the modified signal is played back in an authorised manner on screen, without recording having occurred. We have appreciated therefore that a new copy protection method is desirable.

The emergence of digital video recorders has also created new problems for owners and producers of video content who wish to protect their content against copying. The protection techniques mentioned above for example have been found to be ineffective on digital recorders owing to the different way in which the video signal is processed and ultimately played back.

Digital video recorders are understood to mean any recorder using digital techniques to record and store data, regardless of whether the data is stored on tape, DVD or other portable physical media, a solid state memory device, or in memory.

A number of improvements and refinements have been made to the basic process described above. U.S. Pat. No. 6,516,132 describes a process that has been successfully exploited for NTSC format video signals. Phase errors of ideally 180 degrees (complete phase inversion) are introduced to part of the colour burst, ideally the first half, on two or four lines in every twenty. This process causes distracting bands of incorrect colour (hue errors) to appear in the reproduced video image when the video signal is recorded onto VHS tape and replayed.

U.S. Pat. Nos. 6,035,094 and 6,041,158 discuss similar modifications, which cause all or part of the reproduced video signal to be displayed with the incorrect hue.

Most of the prior art addresses both NTSC and PAL video formats, but in practice there are two significant problems with applying this technology to PAL. Firstly, by design the standard PAL colour encoding mechanism incorporates resilience to hue errors (this being a known weakness of the NTSC system). Thus, a greater disruption to the video signal is required before an illegal copy exhibits sufficiently distracting hue errors to be unwatchable. Simply applying a greater level of disruption in the prior art system can cause problems with legal playback of the original content.

Secondly, there is an implementation issue which can make it much more computationally expensive to implement colour burst modification on a PAL video signal. Most analogue video signal outputs are generated digitally at the present time, by passing digital samples, locked in position relative to the start of the video line, through a digital to analogue converter. The ease with which these samples can be modified for the PAL and NTSC processes depends on the original design of these colour encoding mechanisms, as follows.

The standard NTSC colour encoding mechanism locks the phase of the colour burst signal to the start of each video line. The colour burst is a high frequency sine wave (strictly, it is an unmodulated colour subcarrier), and if there were an exact number of cycles of that sine wave in each video line, then the colour burst would be identical on each video line. However, there are exactly $(455/2)=227.5$ cycles per video line. Given that there is an extra half cycle per line, this means that the same pattern occurs on every second line, with another pattern occurring on every other line. Thus in total there are only two patterns which can occur. When generating the video signal using digital signal processing, as is common at the present time even for analogue video signals, this means only two waveforms need to be considered. Further, when modifying the colour burst to introduce copy protection, any phase locked modification can only take two possible forms. Rather than calculating the complex mathematical transforms that may be necessary in the actual video encoding device, the calculations can be performed once at the design stage, and the two possibilities can be stored in computationally efficient "look up tables". The digital samples are simple read from a table when needed.

The standard PAL colour encoding mechanism is quite different. The number of cycles of high frequency sine wave per line is ((1135/4)+(1/625))=283.7516 cycles per video line. This was chosen in the early days of colour television to cause intentional differences between each line, so that the high frequency information which is used to represent the colour video signal would be less visible on monochrome TV sets common at the line. The result is that the phase of the colour burst, relative to the start of the video line, is slightly different on each and every video line. Similarly, when modifying the colour burst to introduce copy protection, any phase locked modification must be slightly different on each and every video line. Either the modification must be performed within the device itself, or else an individual look up table must be created for each and every video line. Neither approach results in an efficient implementation.

A further drawback with the prior art is that the hue errors resulting from the copy protection can be corrected by subsequent processing. They represent a change in the video information which is "reversible". We have appreciated that it would be beneficial if the information were partially or totally destroyed, making subsequent restoration of the illegal copy impossible.

SUMMARY OF THE INVENTION

The invention is defined in the independent claims to which reference should now be made Advantageous features are set forth in the dependent claims A copy protection method and apparatus is provided. Various protection signals are added to a video signal in the vicinity of the colour burst part of the signal. The protection signals are selected to interfere with the frequency down conversion process in the video recorder so that the colour burst cannot be recorded properly. The protection signals are chosen so that when a modified video signal containing the original video signal and the protection signals has been recorded by a video recorder, playback of the modified video signal exhibits visual artefacts that are not visible before recording of the modified signal occurred. The protection signals may also be used to carry digital control information for controlling the operation of a digital recorder. A circumvention process is also described for removing the protection provided.

BRIEF DESCRIPTION OF THE DRAWINGS

The invention will now be described in more detail by way of example and with reference to the drawings in which:

FIG. 1 illustrates the line blanking interval of a typical composite video signal;

FIGS. 3a and 3b illustrate a scale drawing of the colour burst before and after the addition of the protection signal;

FIGS. 4a to 4c illustrate a second signal for use in the first aspect of the invention;

FIGS. 5a and 5b illustrate a scale drawing of the colour burst before and after the addition of the protection signal;

FIGS. 7a to 7d illustrate four different protection signals in an alternative embodiment of the invention;

FIG. 8 is a table containing parameters describing the protection signals shown in FIGS. 7a to 7d;

FIGS. 10a and 10b illustrate a scale drawing of the colour burst before and after the addition of the protection signal of FIG. 9 to an in-phase line;

FIGS. 11a and 11b illustrate a scale drawing of the colour burst before and after the addition of the protection signal of FIG. 9 to an in-phase line;

FIGS. 14a, b and c illustrate the interference of a sample protection signal with the circuits in a video recorder; FIG. 14a illustrates a modified colour burst and back porch.

FIG. 15 illustrates possible encodings for a digital control signal;

DETAILED DESCRIPTION OF THE PREFERRED EMBODIMENTS OF THE INVENTION

Figure 2A:
FIGS. 2a to 2c schematically illustrate a colour burst, a protection signal according to a first aspect of the invention in isolation, and the combination of the protection signal and colour burst, respectively.

The preferred embodiment of the invention provides a method and an apparatus for modifying a signal to be viewable in the normal way on a receiver, such as a television or monitor, but such that any copy of the modified signal made with a video recorder is substantially unwatchable due to the presence of visual artefacts or errors in the displayed signal. The apparatus and method according to a preferred embodiment of the invention involve modifying the colour burst, and/or the region of the signal directly before the colour burst to provide protection against copying.

In known PAL and NTSC video systems the colour information is represented by two colour-difference signals which are used to modulate a respective subcarrier signal. The subcarrier signals have the same frequency and amplitude but are arranged to have a 90° phase difference, so that they are in quadrature. The subcarrier signals are then added to a signal representing the monochrome picture information to form a composite video signal having luminance, chrominance and synchronisation information.

FIG. 1 to which reference should now be made, illustrates a standard line of video information 2. The line comprises a negative going horizontal or line synchronisation pulse 4, followed by a substantially flat portion of the signal 6 known as the back porch. The line synchronisation pulse is detected by a television receiver and used to control the flyback of the scanning electron beam from the end of one line on screen to the beginning of the next. The back porch has a voltage level of 0V and is used by the television receiver to establish a reference voltage for black picture information. Following the back porch is a line of picture information 8 containing chrominance and luminance information. Essentially, the amplitude of the signal above the reference voltage indicates the luminance or brightness of the signal.

In order that the receiver can distinguish between the two quadrature components of the colour information, a phase-reference signal is transmitted in the back porch region of the signal after the line synchronisation pulse. This signal is known as the colour burst 10 and comprises 9 to 11 cycles of the subcarrier signal having a constant amplitude and a phase that corresponds to one of the two quadrature components.

The colour burst is used in the receiver to generate a continuous reference subcarrier which is frequency and phase-locked to the burst. This can then be used to separate the colour information signals and reproduce the colour information at the receiver.

The frequency of the colour subcarrier signal is within the video bandwidth of the picture information but is chosen so that it is not a multiple of the line rate or the field rate of the composite signal. If this were not the case, then the peaks and troughs of the subcarrier signal representing the chrominance information could line up on adjacent lines of the picture and, being displayed by the receiver, result in visible artefacts that would ruin the picture quality. The frequency is therefore chosen so that the peaks and troughs are therefore always substantially out of phase on adjacent lines. As a result the colour burst signal phase can be said to vary from line to line relative to the line synchronisation pulses. Of course the subcarrier signals for the chrominance information varies in the same way, so this does not stop the colour signal from being decoded. This variation in phase is a feature that is taken into account by a preferred embodiment of the invention as described below.

In front of the line synchronisation pulse and after the picture information of the preceding line is another flat region of the signal with a level of 0V. This is known as the front porch 12 and serves to prepare the circuits in the receiver for detecting the line synchronisation pulse. The front and back porches, and therefore the line synchronisation pulse and the colour burst, all therefore occur within a region of the signal that is not displayed on screen. This region is collectively referred to as the horizontal blanking interval 14.

The present applicants have appreciated that, rather than causing hue errors in the reproduced signal, it is possible to modify the video signal such that the Colour Killer circuit found in most consumer VCRs is triggered. The Colour Killer circuit monitors the colour burst, and disables colour decoding when either the colour burst is not present (e.g. in a monochrome broadcast) or is insufficient to produce a good quality colour picture (poor TV reception off-air, poor quality tape etc). When the Colour Killer is triggered, the reproduced image will be black and white only.

Colour Killer circuits are also found in domestic televisions. The challenge therefore is to design a copy protection signal such that the Colour Killers in VCRs are triggered, but those in TVs are not. U.S. Pat. No. 3,975,759 describes a possible Colour Killer circuit in a VCR. In practice, the combination of the Colour Killer circuit with the filtering, colour AGC and recording circuitry in a VCR causes the VCR's Colour Killer circuit to have the following differences from those found in a TV: first, the bandwidth of the signal presented to the Colour Killer is lower; second, the Colour Killer responds to an earlier part of the Colour Burst interval; and third, the Colour Killer is less sensitive to small amplitude variations (due to aggressive colour AGC in the VCR).

Thus, a signal attacking the Colour Killer must be targeted within the narrow bandwidth of the circuit, occur early in the colour burst interval, and be of high amplitude. As is known in the art, the signal must be out of phase relative to the existing colour burst to cause a disruptive effect; if it is in phase, it will merely add to the colour burst, and have little effect. Also, it can be beneficial to trim the colour burst itself.

It was determined experimentally by the applicants that fewer, higher amplitude pulses were more effective than more, lower amplitude pulses—a finding that matches the known circuit and its aggressive colour AGC. Using square, rather than sine shaped pulses allows the amplitude of the fundamental to exceed the clipping point of the system (Fourier analysis of a square wave proves this point). In a typical video system, the clipping point is around 1V, and in such systems, two pulses are required to activate the Colour Killer circuits in a majority of VCRs.

First Aspect of the Invention

An anti-copy signal protection according to a first aspect of the invention will now be described with reference to FIGS. 2 and 3. FIG. 2a is a schematic representation of a line of picture information showing the horizontal synchronisation pulse 4 and the colour burst 10 (no actual picture information is shown) for an NTSC signal.

The duration of the horizontal synchronisation pulse is 4.7 μs. Assuming the leading edge (left hand edge) of the synchronisation pulse receives a time value of 0 s, then the leading edge of the colour burst will occur 5.31 μs later, and the end of the colour burst 8.10 μs later. The edges of the have are defined by an envelope that has a rise and fall time of 300 ns. The amplitude of the horizontal synchronisation pulse is −0.286V.

Figure 2B:
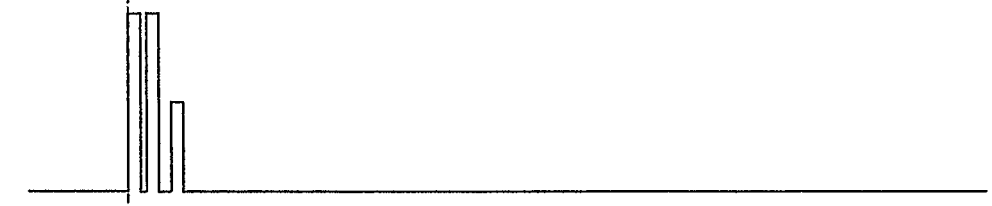

FIG. 2b shows the shape of the protection signal in isolation. It can be seen to comprise two pulses 20 and 22 preferably of equal amplitude, and a third smaller pulse 24 occurring later. In the example shown the two leading pulses have an amplitude of 1.0V, and the lagging pulse has an amplitude of 0.63V. The level between the three pulse is 0V. The two leading pulses 20 and 22 are timed so that they are out of phase with the colour subcarrier on that line. In the embodiment illustrated, the first pulse begins at a time of 4.7 μs (so that its leading edge is coincident with the rising edge of the horizontal synchronisation pulse). If the duration of the different pulses is then measured in terms of cycles of a 27.0 MHz clock (starting from 4.7 μs and ending at 5.588 μs after 24 clock cycles), the duration of each of the pulses is 5 cycles, the spacing between the first and second pulses is 2 cycles, and the spacing between the second and third pulses is 7 cycles.

The first two pulses 20 and 22 are present to activate the Colour Killer in the video recording device. The applicants have determined that if this protection signal is placed sufficiently early in the colour burst interval, then most television sets will simply ignore it. However, some television sets gate the colour burst early, and the presence of the pulses causes a slight hue error on these devices. To compensate for this, the third pulse is added to the signal to improve playability during legitimate playback on a television set. Specifically, this third additional pulse is "in phase". The third pulse may be omitted if the specific television set on which the protected signal is to be played is not susceptible to the hue errors mentioned above.

Figure 2C:
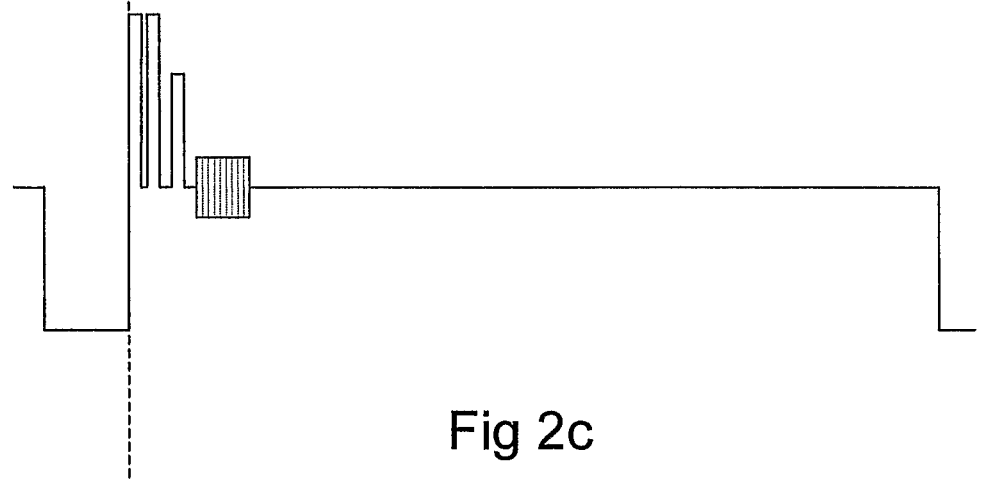

The protection signal (FIG. 2b) combined with the line of the picture information (FIG. 2a) is shown in FIG. 2c. In addition to the three pulses, the protection comprises a slight reduction in the duration of the colour burst, so that it comprises a partial colour burst beginning at a time value of 5.97 µs, and ending at a time value of 7.97 µs. In the diagram the rising and falling portions of the colour burst (of duration 300 ns) are therefore shown as missing. FIGS. 3a and 3b show an actual unmodified and modified signal respectively.

The signal shown is NTSC format. Recall that there are 227.5 cycles of colour subcarrier per line. This means that on alternate lines the copy protection pulses should be shifted by the equivalent of half a cycle to remain out-of-phase with the colour burst. However, the first pulse is located at the rising edge of the horizontal sync pulse, and this rising edge is used by some television sets to determine the start of the video information. Moving this pulse on alternate lines would cause some sets to draw alternate lines shifted to the left. This would cause a distracting artefact (a "zig-zag" or "jigsaw" pattern) on legal playback, and so must be prevented.

However, maintaining the pulses at the same location relative to the horizontal synchronisation pulse would reverse their effect on alternate lines, that is the Colour Killing pulses would be in phase, and fail to work. Having no pulses on alternate lines is also found to give rise to a zig-zag pattern, because the significantly lower amount energy in the rising edge of the horizontal synchronisation pulses in unmodified lines causes the trigger mechanism to trigger more slowly in some television sets. The applicants have therefore found that the solution is to include a series of pulses on alternate lines that allow the trailing edge of the horizontal sync pulse to remain in the same location on all lines, but do not interact with the colour decoding in any way.

The pulses illustrated in new FIGS. 4 and 5 perform this role. Their frequency is far above the bandwidth of the colour decoder filter, and so does not interact with it. Alternatively, the pulses shown in FIG. 4 can be low pass filtered to create a half amplitude fat pulse, which has a similar non-effect, while causing triggering at the correct point.

Once again FIG. 4a illustrates an unmodified line of picture signal, showing the horizontal synchronisation pulse 4 and colour burst 10, but no picture information. FIG. 4b shows the pulses added to restore picture stability in isolation. The pulses begin at a time value of 4.7 µs after the leading edge of the horizontal synchronisation pulse, so that the first pulse combines with the rising edge of the horizontal synchronisation pulse. Four pulses are shown with an amplitude of 1.0V, which is identical to those shown in FIG. 2b. The width of each pulse is 37 ns, which is 1 cycle of the clock period of 27 MHz, and they are separated by 37 ns. Thus, the pulses may be approximated by a square wave or sine wave with similar characteristics. Similarly, the colour burst of the modified signal is trimmed or reduced in the same way as shown in FIG. 2c. However, in FIG. 4c, the colour burst begins at 5.822 µs and ends at 7.822 µs. The duration is therefore the same. FIGS. 5a and 5b show an actual unmodified and modified video signal respectively.

The parameters given for the first set of pulses shown in FIGS. 2 and 3 are designed to work with alternating lines of the second set of pulses shown in FIGS. 3 and 4. Ignoring the problems mentioned above, applying the pulses on FIGS. 2 and 3, suitably phase shifted, to all lines, would give too much signal disruption and even legal playback may be disrupted. If further permutations are attempted, a balance must be struck between playability and effectiveness.

Note that while some of the diagrams herein may look superficially like known AGC pulses, such as those disclosed for copy protection in e.g. Morio U.S. Pat. No. 4,163,253 they are quite different. The duration of the pulses herein does not have a significant effect on the signal or luminance (or brightness) AGC circuit because the pulses are too short. Also, their position is critical relative to the phase of the colour burst.

A further copy protection system for NTSC systems will now be described in detail.

Figure 6A:
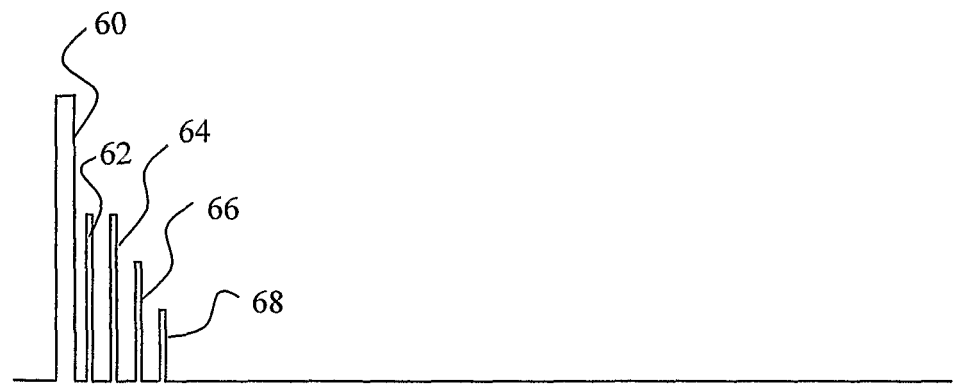
FIGS. 6a and 6b respectively illustrate a first protection signal, in isolation and when combined with a line of video signal, in a preferred embodiment of the invention.

A first protection signal is shown in FIG. 6a. This comprises a large initial or leading pulse 60, and four secondary pulses 62, 64, 66 and 68. These are positive going pulses. The first two secondary pulses 62 and 64 have substantially equal amplitudes, while the third and fourth secondary pulses 66 and 68 have increasingly smaller amplitudes. The timing and duration of the pulses in the second protection signals is as follows, given in units of microseconds, with timings relative to the leading edge of the horizontal synchronisation pulse which is taken to occur at a timing of zero.

|  | Timing (µs) | Duration | Height |
| --- | --- | --- | --- |
| Initial Pulse | 4.39 | 0.185 | 1.506 V |
| 1st Secondary Pulse | 4.797 | 0.037 | 1.22 V |
| 2nd Secondary Pulse | 5.242 | 0.037 | 1.22 V |
| 3rd Secondary Pulse | 5.686 | 0.037 | 0.95 V |
| 4th Secondary Pulse | 6.094 | 0.037 | 0.65 V |

The heights of the pulses given above are the preferred values. However, the heights can be varied within a range of +−10%.

The beginning of the colour burst in an NTSC signal for example occurs at about 5.3 µs and terminates at 8.4 µs. The amplitude of the synchronisation pulse is minus 0.286V, and the width is 4.7 µs.

Figure 6B:
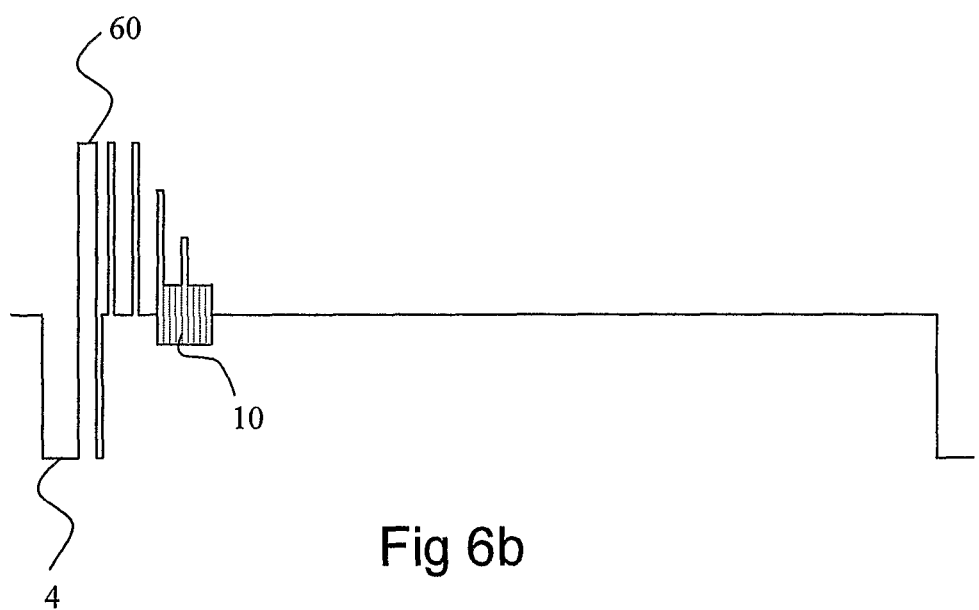

The protection signal is added to an unmodified video signal to produce the alternative modified signal shown in FIG. 6b. The timing and duration of the first pulse cause it to be added to the line synchronisation pulse adjacent its trailing edge, while the secondary pulses are added to the back porch. The first pulse is entirely contained within the line synchronisation pulse, such that after the peak of the first pulse, the voltage of the signal drops back down to the negative reference level of the synchronisation pulse before rising again to the back porch level.

The amplitude of the first pulse is greater than that of the secondary pulses 62 and 64, by an amount that is equal to the amplitude of the line synchronisation pulses, so that after addition of the second protection signal the first and second pulses have the same resultant amplitude.

An alternative technique shall now be described with reference to FIG. 7. In this technique pulses are also added to the region of the signal before the colour burst portion of the signal. There are four different arrangements of pulses and each arrangement is used on a separate line. This is done to ensure that the effect of the copy protection is experienced once recorded, but such that an unrecorded protected signal has good playability on a receiver.

As can be seen from FIGS. 7a to 7d, a number of parameters are varied for each of the protection signals. These are the duration of the synchronisation pulses, the number, width timing and height of the additional pulses, and the timing and duration of the colour block. The different parameters are set out in FIG. 6 for ease of reference.

Thus, the first two types of protection signal (A1 and A2) have three pulses, a small leading first pulse 71 followed by two full pulses 72 and 74. The third and fourth protection signals (B1 and B2) on the other hand have only the full pulses 72 and 74, though the line synchronisation pulse is slightly different from the case shown in FIGS. 6a and 6b. The amplitudes of the two full pulses vary from 1V to 0.6V and 0.7V within each pair of signals (A and B).

The timings and amplitudes of the signals shown in FIG. 7 are given in more detail in FIG. 8 to which reference should now be made.

Preferably, the first two arrangements of pulses (A1 and A2) are used alternatively on lines of the NTSC video signal as follows:
Colour Field 1: Line 21, 23, 25, 27, 29, . . . , 253,
Colour Field 2: Line 22, 24, 26, 28, 30, . . . , 254,
Colour Field 3: Line 22, 24, 26, 28, 30, . . . , 254,
Colour Field 4: Line 21, 23, 25, 27, 29, . . . , 253, An A1 signal will therefore appear on line 21, with an A2 signal on line 23, an A1 on 25, and an A2 on 27 and so on.

At the same time, the third and fourth arrangement of pulses, are preferably used on the alternate lines as follows:
Colour Field 1: Line 22, 24, 26, 28, 30, . . . , 254,
Colour Field 2: Line 21, 23, 25, 27, 29, . . . , 253,
Colour Field 3: Line 21, 23, 25, 27, 29, . . . , 253,
Colour Field 4: Line 22, 24, 26, 28, 30, . . . , 254, To summarise, the applicants have determined a number of significant factors for the shape and placement of the protection pulses.

A pulse at front of the colour burst has more effect. The effect drops dramatically when the pulse moves from front to middle of colour burst, then drops gradually when the pulse moves from the middle to the rear of colour burst. The pulse in the middle and rear of colour burst has almost no effect on most VCRs. The location of pulse is not so significant for playability on most television sets. However, a pulse ahead of the rising edge of the horizontal synchronisation pulse may cause playability problem for some set, such as loss of image, image shift, and vertical jigsaw effects.

In general, a wider pulse has more effect. However the effect does not increase significantly when the width exceeds ⅔ of the period of colour burst.

A pulse with a large amplitude has more effect. Experiments show that the effect on most VCRs' increases gradually with slight hue errors and colour noise when the amplitude increases from 0 to 0.8V, and then increases sharply as the amplitude increases further and the Colour Killer circuits are activated. However, some sets have been found to be very sensitive to the amplitude of the pulse when the amplitude and width is large enough. Usually the largest amplitude that the pulse can be is 1V due to the requirements of TV standards and the limitation of D/A firmware.

In general, the greater the number of pulses, the greater the effect. However, more pulses are more likely to cause playability problem: experiments show that many small pulses cause more playability problems than a single large pulse.

Thus, the effect on the VCR will be increased and the playability on the television set will be decreased as the amplitude, width, and the number of pulses is increased.

| Principles | Reasons |
|---|---|
| Pulse should be added to the front part of the colour burst. Compensation pulse should be added to the middle part of colour burst. If more than one compensation pulse is required, some of them can be added at rear part of colour burst. | Pulse at front part affect VCR, pulse at rear part affect TV The effectiveness will be lost if the compensation pulse is at front part of colour burst. The playability will not be properly recovered if all compensation pulses are at the rear part of colour burst. |
| Preferably, the rising edge of the pulse should be no earlier than rising edge of the horizontal synchronisation pulse. | Causes image shifting on some sets, and the image to disappear. |
| Rising edge of first pulse for all lines must be identical. | Otherwise may cause vertical jigsaw on some sets. |
| The overall energy of first several pulses in different lines should be comparable. | Otherwise may cause vertical jigsaw on some sets. |
| The amplitude of the pulse should be large enough. | Only large pulses can cause enough of an effect on a VCR. In general, few large pulses has more effect and causes less playability problems, than many small pulses. The amplitude of the pulse is more important than the number of pulses. |
| It is not necessary to design many pulses. Experiments show that two to three pulses is enough. | Too many pulses are more likely to cause playability problems such as distortion of hue and saturation. |
| The amplitude of the pulse cannot be too large. | Most video generating and processing equipment requires that the amplitude of the protection pulse should not exceed 1 V. |
| The pulse must wide enough, but not too wider. Experiments show that 5 clock cycles is a preferred width. | A narrow pulse has little effect. Increasing the number of narrow pulses increases the effect but it causes more playability problems. Pulses that are too wide also cause playability problems. |
| The amplitude of the compensation pulse cannot be too large. | Too large an amplitude causes playability problems. The limitation on the width and numbers of compensation pulse is less than that for the protection pulse. |
| Occasionally, it is advantageous to split and use more compensation pulses at different locations. The front part of the colour burst can be removed. | Because the frequency components of many pulse are complicated, it is not easy to use a single compensation pulse to improve the effect. Cutting off part of colour burst can enhance effectiveness. |
| The interval of neighbouring pulse is 7~8 clocks | The period of colour burst is about 7.6 clock |

Second Aspect of the Invention

As has been previously described, the standard PAL colour system is designed such that the phase of the colour signal relative to the horizontal synchronisation pulse is different on each and every line, so the above system cannot be simply and efficiently applied to PAL. Though the above system can be applied to PAL using a different signal for each line, the applicants have appreciated that a different and more efficient system was possible.

Furthermore, the applicants have appreciated that the properties of the standard PAL signal which caused problems with prior art colour disruption systems (e.g. the resilience to hue errors due to averaging phase on adjacent lines; the different phase of the colour burst relative to the horizontal synchronisation pulse on every line) could be used as an advantage if a system were designed specifically for PAL from the outset. Further, knowledge that short larger amplitude excursions can trigger the Colour Killer circuit in VCRs can also be used as an advantage.

It is known from the prior art that, on average, the resultant phase of the protected signal as seen by the television set must be correct, otherwise the set cannot display the protected signal during normal replay. However, modifications which are "short term" or "alternating" in some way can disrupt the phase at a given instant, disrupting the illegal copy, while maintaining the correct average. Thus the prior art suggests that the phase should be correct on average in the long term, but may be incorrect in the short term.

However, standard PAL colour encoding inverts the colour signal on every second line. In television sets, standard PAL colour decoding also inverts the colour signal on every second line to restore it to the correctly polarity. Further, all but the oldest PAL television sets then take the average of the phase over two lines, thus cancelling any phase (hue) errors which existed on adjacent lines. The system cannot prevent phase errors from having any effect: in cancelling them out, phase (hue) errors are replaced by amplitude (saturation) errors. It is thought that seeing slightly too little or too much colour on the screen is less annoying than seeing the wrong colour.

This suggests that the prior art assumption for PAL is wrong: instead, it is the phase error in adjacent lines which is critical. It may be useful to ensure the correct phase is produced when averaging over two lines during PAL decoding, but it may be that even here, phase errors are tolerable because they will not give rise to visible hue errors on the screen. They will give rise to reduced saturation, a fact which will be returned to later.

If the protection signal is chosen carefully, it need not be phase locked to the colour burst. The phase inversion line-by-line and the change within a frame found within a standard PAL signal can be used to give rise to the necessary out-of-phase and in-phase portions, and any desired average phase. The key to achieving this is a simple change of approach: rather than modifying the phase of the existing colour burst, or replacing part of the existing colour burst with a modified colour burst, a signal of fixed phase is added over the top of the existing colour burst.

Thus, the applicants have appreciated that, with the PAL system changing phase line by line, a protection signal which is constant and locked to the horizontal sync pulse, rather than the colour signal, is appropriate. This signal is relatively simple to generate (it is the same on each and every line), and the necessary phase modifications to keep the average correct (giving good playability) while yielding short term phase errors (giving good effectiveness) are caused by the existing phase variation of the PAL colour burst relative to the horizontal sync pulse. Crucially however, the frequency of the added protection signal is comparable with that of the colour subcarrier. It may for example vary by up to 20-25% of the colour subcarrier frequency.

Further, the added signal is greater than the amplitude of the underlying colour burst. This ensures that, when in-phase, the amplitude of the resultant signal is more than double that of a standard colour burst. Also, it ensures that, when out-of-phase, the underlying colour burst is cancelled out and the resultant signal is completely out of phase.

The nature of the standard PAL colour burst ensures that regions of in-phase and out-of-phase relationship occur equally in every frame of video, and that these two possibilities alternate every two lines of video.

The result is that the average phase, though not correct, is sufficiently accurate over both adjacent lines and the entire frame, for PAL decoders to reconstruct a video signal of the correct hue, while at the same time the colour burst itself is so irregular that Colour Killers in VCRs are triggered for at least half of the video frame, if not all of it. This leads to a reproduced image where most of the frame is monochrome, with (typically) just the very top being reproduced in noisy colour.

Figure 9A:
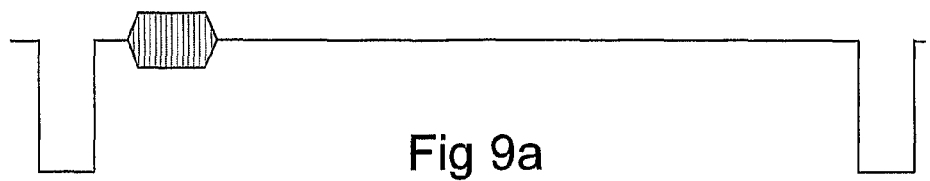
FIGS. 9a to 9c schematically illustrate a colour burst, a protection signal according to a second aspect of the invention in isolation, and the combination of the protection signal and colour burst, respectively.

A suitable protection waveform is shown in new FIG. 9: the unmodified picture signal is again shown in FIG. 9a for reference. The amplitude of the horizontal synchronisation pulse shown is −0.3V, while that of the colour burst is 0.3V peak-to-peak. The duration of the horizontal synchronisation pulse is 4.7 µs. Assuming that the leading edge of the synchronisation pulse receives a time value of zero, then the beginning of the colour burst begins at 5.43 µs and ends at 7.93 µs.

Figure 9B:

FIG. 9b illustrates the protection signal, which is added to the back porch of the video signal between the line synchronisation pulses and the colour burst. The protection signal is arranged to overlap the colour burst portion so that the width of the unaltered colour burst is reduced.

The protection signal shown in FIG. 4b comprises 6 cycles of a square wave of frequency 4.5 MHz. It will be appreciated that this has a slightly different frequency to that of the colour burst itself, which is typically 4.43 MHz. The actual frequency of the square wave could vary however between about 3.5 MHz and 5.5 MHz. Preferably, the leading two cycles of the protection signal have an amplitude of 0.066V above zero but 0.033V below zero (the diagram has been shown symmetrical about zero, but this is not necessarily the case). The subsequent four cycles have an amplitude of 0.195V above zero and an amplitude of 0.235V below zero. This arrangement has been found to improve playability. The protection signal begins at a time value of 5.1 µs, after the leading edge of the horizontal synchronisation pulse, with the step in amplitude occurring at 5.544 µs. The duration of the protection signal is 1.333 µs.

Figure 9C:
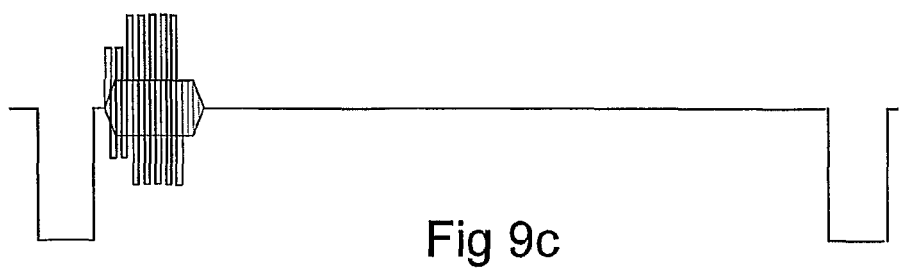

FIG. 9c illustrates a resulting line of picture signal with the protection signal added. The diagram is not to scale. The combination of the protection signal with the underlying colour burst results in a modulation of amplitude ±0.08± for the first two cycles and ±0.311 thereafter. This value is comparable to the magnitude of the horizontal synchronisation pulse, although this is not evident from the schematic diagram (see FIG. 10 for a scale drawing). Additionally, the amplitude of the colour block is reduced to ±0.119V.

A line where the protection is in phase with the underlying colour burst is shown in FIG. 10b. A line where the protection is out-of-phase with the underlying colour burst is shown in FIG. 11b. Reference lines are shown in FIGS. 10a and 11a.

In other embodiments the protection pulse may comprise just under 7 cycles of oscillation (6 and 5/6) cycles added to the video signal so that it overlaps the colour burst. The peak-to-peak amplitude of the first two cycles is then preferably 132 mV, but could be in the range 10 mV to 300 mV. The peak-to-peak amplitude of the subsequent four and 5/6 cycles is preferably 388 mV, but could then lie in the range 10 mV to 750 mV. Similarly, the protection signal is added to the video signal so that it occurs 5.1 µs after the leading edge of the line synchronisation pulse, with the cycles of greater amplitude starting 5.544 µs after the leading edge of the line synchronisation pulse.

The different amplitudes of the two sections of the added signal are chosen to roughly correspond to that of the underlying colour burst. It will be appreciated that a closer match to the underlying colour burst signal could easily be achieved, with additional computational complexity. That illustrated in FIG. 9 has been determined experimentally to be sufficient to create a working system. In general, the amplitudes are roughly double that of the underlying colour burst. Some tuning to the amplitude has been carried out experimentally, as discussed in the following sections.

The basic PAL protection may be further enhanced in two ways.

Firstly, as discussed, PAL decoders in TVs avoid hue errors by averaging adjacent lines. Any phase error will cancel out, giving rise to a saturation error (too little colour) rather than a hue error (wrong colour). This is a predictable process, and can be used to advantage. If the protection is designed such that a known specific amount of colour loss will be generated within the television set's PAL decoder, but the amount of colour in the image itself it pre-corrected when the protection is added (i.e. increased to compensate), then the image displayed on a television set during legal playback will be correct.

This gives an additional advantage: any hacker attempting to remove the copy protection cannot simply remove the protection signal; they must also correct the colour level in the entire image, thus increasing the amount of processing required, and the difficulty in effectively removing the copy protection.

If this extra processing required to increase the amount of colour in the image during the generation of the protected content is not acceptable, a simpler method of increasing the saturation of the displayed picture is to reduce the amplitude of the underlying standard colour burst. This works as follows: the television set uses the amplitude of the colour burst to operate an automatic colour control which sets the gain of the colour processing circuits. By artificially lowering the amplitude of the colour burst, the television set can be tricked into over-amplifying the colour information, so restoring the original level of saturation.

Reducing the amplitude of the colour burst has the additional benefit of increasing the effectiveness of the copy protection. However, it must be done with care: a larger phase error generated by the copy protection (which increases effectiveness and reduces saturation) combined with a larger compensatory decrease in the colour burst amplitude (which increase effectiveness and increases saturation) will lead to a signal with poorer signal to noise ratio in the colour image, and eventually no colour at all. In practice, the Colour Killer circuits in the television set will activate long before the Colour Burst amplitude is reduced to zero, and avoiding this is part of good copy protection design. The parameters of the signal illustrated in FIG. 9 are believed to be optimal. This signal has been fine tuned on a wide variety of makes and models of PAL television sets.

Secondly, the protection itself can be varied in time to increase the annoyance caused when viewing an illegal copy, e.g. by flashing the colours on and off. Time varying protection has been used with AGC (Automatic Gain Control) pulses for many years, in order to make the brightness of the copied signal vary in an annoying manner, simply by varying the amplitude of the AGC pulses. However, no previous Colour Burst protection mechanisms have been able to take advantage of the increase in viewer "annoyance" that would be created by switching the protection on/off, or varying its amplitude, because Colour Burst modifications only work with very specific designed parameters, such as those presented here. For most systems, there was an unstable, unusable region between "on" and "off". For other systems, the processing required to change between on and off in a gradual, stable way was simply too complex to implement in a commercial device.

Thus, the present applicants have appreciated that it would be desirable to create two different protections signals having a similar effect on playability, and allowing one to be switched to the other without causing any instability on legal playback.

A second copy protection system according to an alternate preferred embodiment of the invention will now be described with reference to FIG. 12.

Figure 12A:
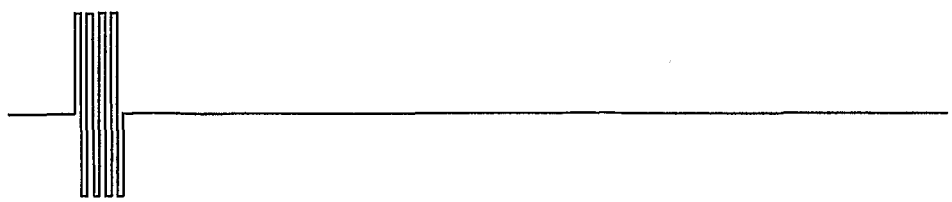
FIGS. 12a and 12b schematically illustrate a second protection signal according to the second aspect of the invention in isolation, and the combination of the protection signal and colour burst, respectively.

FIG. 12a illustrates a protection signal, which is added to the back porch of the video signal between the line synchronisation pulses and the colour burst. The protection signal is arranged to overlap the colour burst portion so that the width of the unaltered colour burst is reduced.

The protection signal shown in FIG. 12a comprises 4 cycles of a square wave of frequency 4.5 MHz. It will be appreciated that this has a slightly different frequency to that of the colour burst itself, which is typically 4.43 MHz. The actual frequency of the square wave could vary however between about 3.5 MHz and 5.5 MHz. The peak-to-peak amplitude of the protection signal is preferably significantly higher than the colour burst portion itself, having a value of 0.544V compared to the normal peak-to-peak amplitude of the colour burst of 0.3V. The amplitude of the protection signal could be in the range 0.01V to 0.75V peak-to-peak.

Figure 12B:
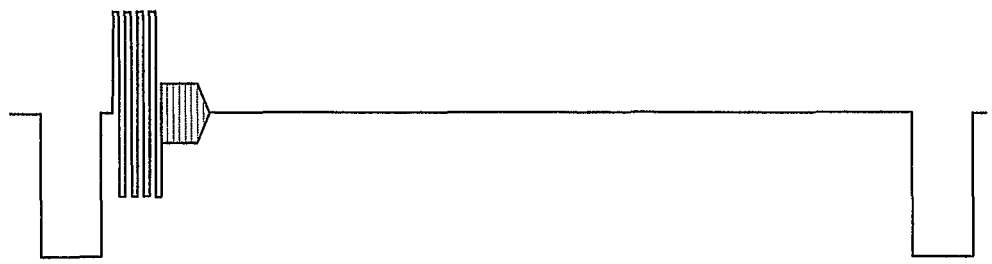

The signal shown in FIG. 12a is added to a video signal to produce the modified video signal of FIG. 12b. The square wave is centred on the 0V level so that the protection signal extends in both positive and negative directions. During this process, the amplitude of the colour burst signal is also preferably reduced to a peal-to-peak value of 0.244V.

The first signal, of FIG. 9, is more effective on many VCRs than the second. Thus switching between the two gives the annoyance of a picture flashing between full colour, and black-and-white only.

Having protection 'switching' between two or more states can also be simply applied to NTSC protection. If the two different line types discussed previously (FIG. 2 and FIG. 4) are swapped out of turn, then the effectiveness is removed, while playability is largely unchanged. Thus swapping between the "in phase" and "out of phase" versions will give the desired colour flashing effect on illegal copies, without damaging playability on legal playback. It is also possible simply to switch the protection on/off to achieve the same effect, but this can cause visible switching transients during legal playback, so is undesirable. Gradually switching the protection on/off by slowly varying the amplitude of the pulses is a possibility, but the simple alternation described above is less computationally burdensome, so is preferred.

Figure 13:
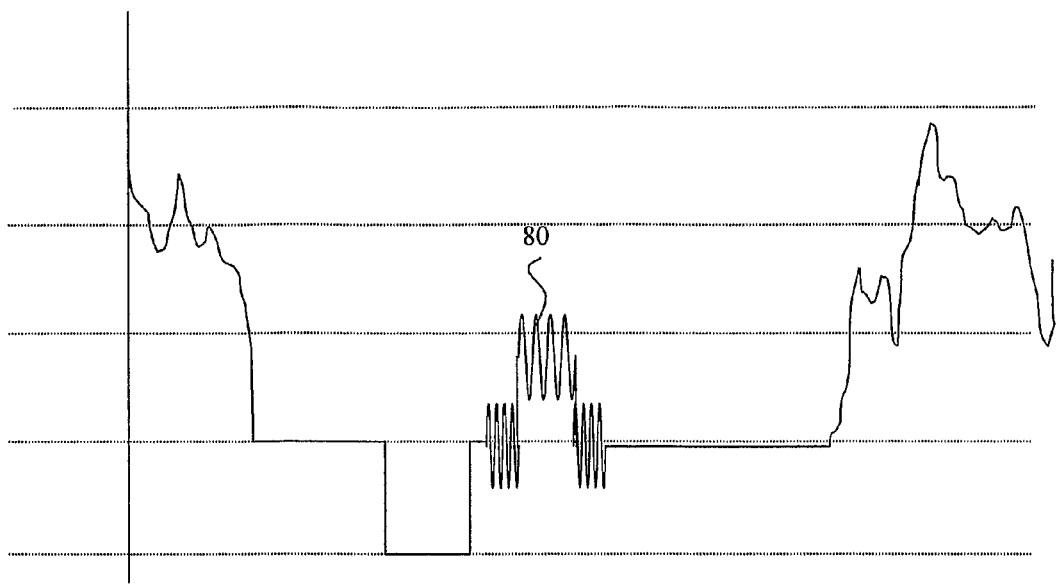
FIG. 13 illustrates a protected video signal in an alternative example.

In the example shown in FIG. 13 a pulse 80 with a frequency different to that of the colour subcarrier has been added to the colour burst portion. As above the frequency of the signal is preferably 4.5 MHz, but frequencies in the range 3.5 MHz to 4.5 MHz have been found to be acceptable. The pulse preferably has an amplitude of about 230 mV, though pulses in the range 10 mV to 400 mV have also been found to be acceptable. Preferably, 6 cycles of the protection signal are superimposed on top of the original colour burst. 4 to 8 cycles have been found acceptable.

The embodiments with reference to FIGS. 9 and 12 have been found to work particularly well with PAL signals, but could be used with NTSC if desired. For NTSC signals the preferred frequency is 3.8 MHz, or in the range 3 MHz to 4.7 MHz.

The interaction of the protection signals with the Colour Killer circuits produces the anti-copy effect. However, the signals also interact with the frequency conversion circuits of a VCR in an advantageous way giving additional protection. This will now be described in more detail.

During the recording process, the recording circuits in the video recorder down-convert the frequency of the video signal so that it is more suitable for storing on tape. The colour burst signal is down converted from a frequency of 4.43 MHz to a frequency of about 627 KHz. Conversely, during the play-back process the recorded signal on tape is then up-converted from 627 KHz to 4.43 MHz.

During the down conversion process, the signal is therefore passed through a band pass filter, and ringing occurs in the recorded signal as a result of the nature of the filter. The presence of the protection signals in the modified signal interact with the ringing caused by the filter in such a way as to distort the representation of the colour burst recorded onto tape, and to further distort the colour burst presented to the receiver on playback of the recorded signal.

FIG. 14a shows an example modification to the colour burst and back porch before the colour burst for the purposes of illustration. Although, this is not the same as the signals shown in the embodiments and examples above, the principle can be thought of as the same. In FIG. 14a the disturbing signal used comprises two pulses, one adjacent the line synchronisation pulse, and one disposed in the colour burst.

Figure 14B:
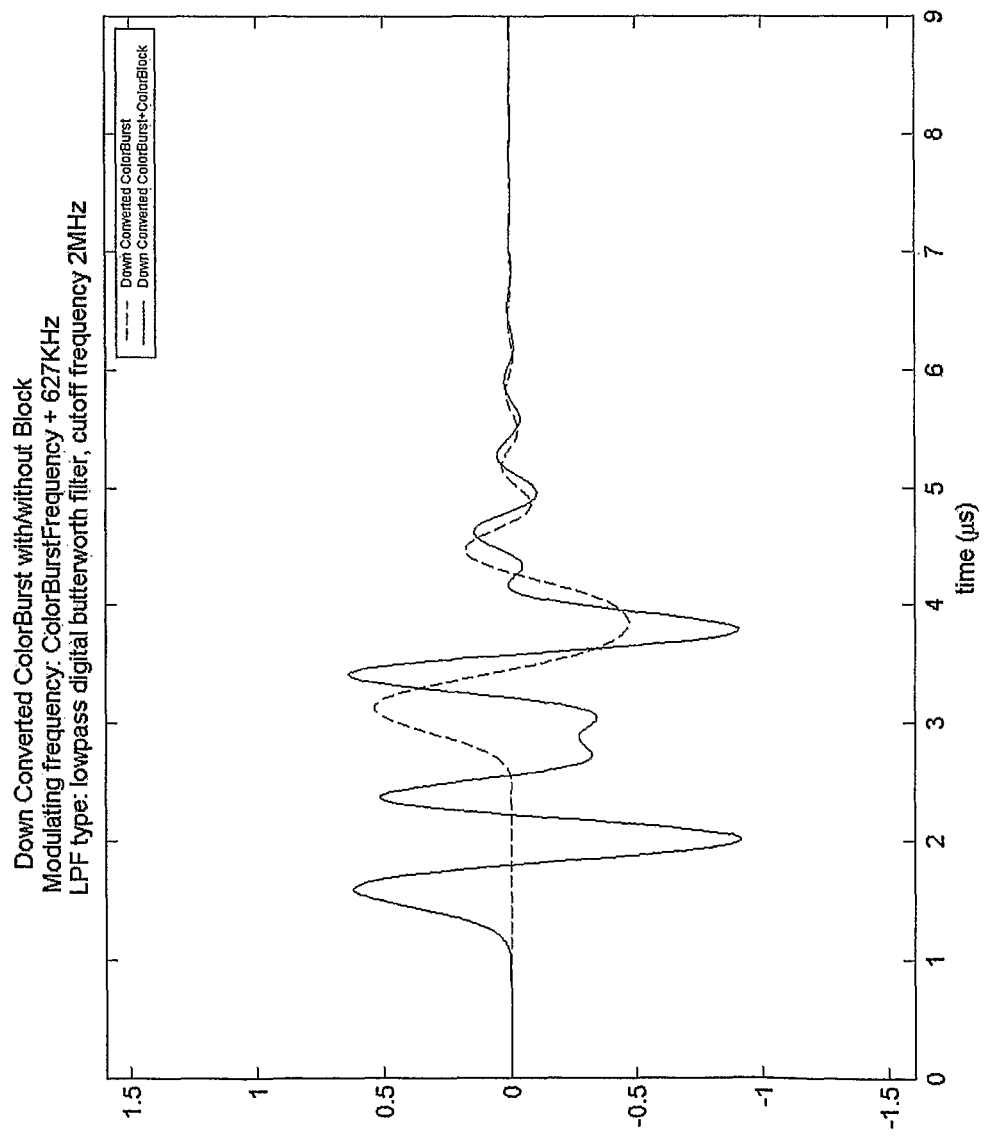
FIG. 14b shows a recorded modified and unmodified colour burst after recording on a video recorder.

The dashed line in FIG. 14b shows a colour burst signal recorded on a video recorder from an unmodified signal, while the unbroken line shows a recorded colour burst signal from a modified copy-protected signal. In the recording process, the colour burst has been frequency down converted by frequency conversion circuits in the video recorder.

The waveforms illustrate that the unmodified colour burst signal can be down converted and recorded in a satisfactory manner, that is the recorded signal is recognisable as an oscillation which fades in amplitude over time, but that the recorded colour burst from the modified signal is less recognisable and exhibits signs of interference such as irregularly spaced peaks and troughs and irregular changes in amplitude. The phase of the signal has also been affected. This signal cannot be properly locked to by the Phase Locked Loop in the Video recorder on playback of the recorded signal, and as result the copied signal is unwatchable.

Figure 14C:
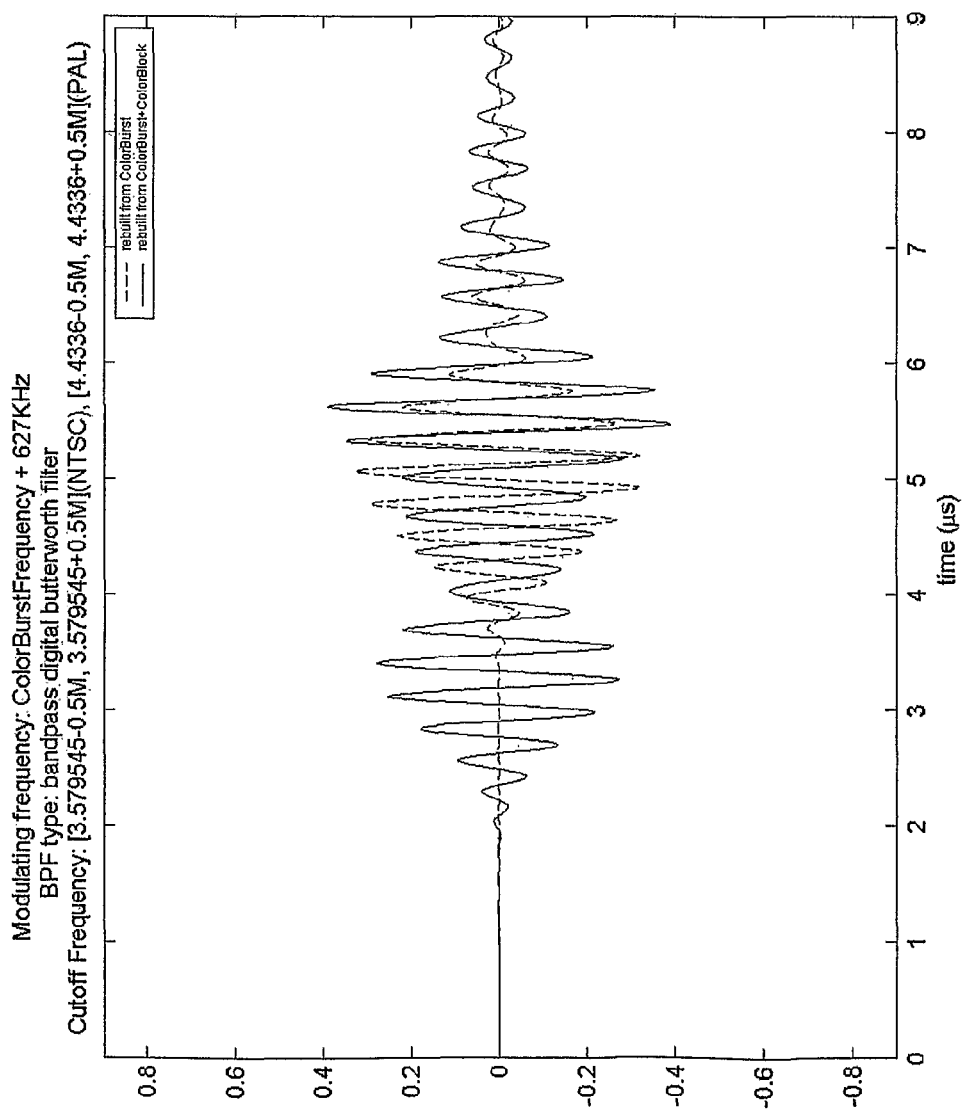
FIG. 14c shows the waveforms of FIG. 14b upconverted and remodulated for playback by the video recorder.

FIG. 14c, shows waveforms in FIG. 14b upconverted and remodulated for playback by the video recorder. As can be seen from the diagram, the unmodified colour burst, shown by the dashed line, maintains a shape its shape when it is remodulated for playback. However, the modified colour burst is unrecognisable, occupying a longer duration of time, and having a modulation envelope with a number of pulses. The phase and the frequency of the upconverted modified colour burst can be seen to no longer match those of the unmodified values.

The effects described above are not however experienced when the modified signal is played back on a receiver before recording. The phase locked loop in typical television receivers can respond quickly enough for the modified signal to be viewed without any loss of picture quality or enjoyment.

The discussion above illustrates the general principle of operation of the preferred waveforms described above. Each of the individual waveforms has also been determined empirically to ensure that the detrimental effects of the ringing are experienced on recording, but that the modified video signal has good playability before recording.

Digital Control Signal

The techniques above provide protection against copying on analogue video recorders. However, it is also desired to provide protection on digital recorders.

The preferred embodiment of the invention therefore also provides a signalling technique based on the protection signals described above. The presence of the protection signals described so far primarily results in copy protection of a video signal on an analogue video recorder. However, the protection signals are preferably also used in a secondary or additional way to represent data. As will be described in more detail below, the presence or absence of a protection signal at a particular location can be used to denote logical data bits, such as binary zeros and ones. Additionally, or alternatively, the parameters of a protection signal may be varied within predetermined boundaries to represent data.

The data that is encoded in the signal is preferably copy control information for a digital recorder. The operation of a digital recorder receiving the data in the video signal may be affected in a number of ways. The data may for example constitute copy protection data that prevents the digital recorder from recording a copy of the video signal altogether. The data may also constitute rights management information, allowing a copy of the video signal to be made but only stored for a limited period of time. The rights management information may for example cause information relating to the author or proprietor, copyright notices or indeed any other information to be displayed before, after or during viewing as appropriate.

Thus, a copy protected signal is provided by the preferred embodiment of the invention that has a dual effect, providing analogue copy protection on analogue video recorders, and through a separate, but linked, signalling method, providing copy protection or digital rights management facilities for digital recorders.

A digital recorder in accordance with a preferred embodiment of the invention is therefore arranged to detect the copy protection signals described above, to extract from the signals the bits of data, and to process the video signal received according to the data content of the signals. A preferred device will be described later with reference to FIG. 12.

FIG. 15, to which reference should now be made shows a number of different encodings of data that could be used to control the operation of the digital recorder. These are intended to be purely illustrative, and many more encodings, and control options could be implemented according to the needs of proprietors and authors. The data encoded in the video signal can be thought of as forming a digital control signal (DCS).

The first two signals digital control signals shown in FIG. 15, '1001' and '1011' are used to indicate the beginning and end of an instruction sequence. Preferably, any such instruction sequence would be repeated through out a video signal so that no matter when the digital receiver picked up the signal for the first time, the protection or control could take effect. The instruction sequence may simply be an instruction to allow or not allow copying, such as signal '1111', in which case the start and end signals are optional. The start and end signals allow more complex information to be represented, such as text information indicating author, proprietor, creation data and so on, or copyright and license terms.

For example, signal '0010' may be included in the video signal to indicate that the digital recorder may only make one generation of copy of the signal. Data may be introduced into the recorded signal to denote it as a first generation copy at the recording stage. Additionally, the signal '0100' may be included to indicate that a permanent copy is not to be made, but that the recorded signal is to be rendered unwatchable after a period of time has elapsed. Subsequent data bits in the video signal are then used to indicate the length of time that copy can be stored.

Additionally, license information may be included. This would allow a copy to be made for example, and held for a certain period of time for viewing. Once this time had elapsed, it may be necessary to arrange a license with the author or proprietor for further viewing.

The unprotected signal '0000' could be added to a signal to indicate that copying is allowed. This could be implemented between the start and end markers as noted above.

Control of the digitally recorded signal by a digital recorder in the manner described above is known and could be implemented by one skilled in the art. Further options, or details of such a system, shall not therefore be described here.

It will be appreciated that the use of a binary data encoding allows the signalling system to be flexible and adaptive. The binary data can be used to indicate what states of a protection scheme are to apply to the video signal, as well as to indicate actual data itself, such as author name, creation date and so on. The use of binary data is therefore preferred over a system in which the presence or the form of the protection signals is used to indicate directly to a digital recorder that a particular action is required. Such a system would however have the advantage of being able to respond quickly to the protection signal, as data bits from several different locations in the signal need not be collected to interpret the meaning of the data signal. The preferred system may therefore be configured to operate in either way, though the use of binary data is preferred.

In order to represent the bits of the digital control signal described above, various modifications are made to the analogue protection signals shown above.

It will be appreciated that the colour burst occurs every line of signal. A modification to the colour burst, or the line blanking interval adjacent the colour burst, to carry a bit of information could therefore result in approximately 600 bits of information per frame, or 15 Kbits/s.

In the simplest case, the presence of a modified colour burst could be used to represent a binary value of '1', while the absence of a modified colour burst could be used to represent '0'. Knowing that the type of the modification used is one of the examples shown above, allows detection to be implemented in a digital recorder with a suitable arrangement of pulse or frequency detectors. Preferably, these are controlled using a gating signal derived from the line synchronisation pulse so that the detectors look at only the relevant part of the signal.

Additionally, parameters of the protection signals may be varied and the variations used to encode binary information. For example, although the preferred frequency of the protection signal shown in FIGS. 9s to 12 is 4.5 MHz, in a preferred embodiment of signalling system, a frequency of 5.4 MHz is used to represent a value of '1', while a frequency of 3.8 MHz is used to represent '0'. The frequency of the pulse added in FIG. 13 could also be varied in this way.

Figure 16A:
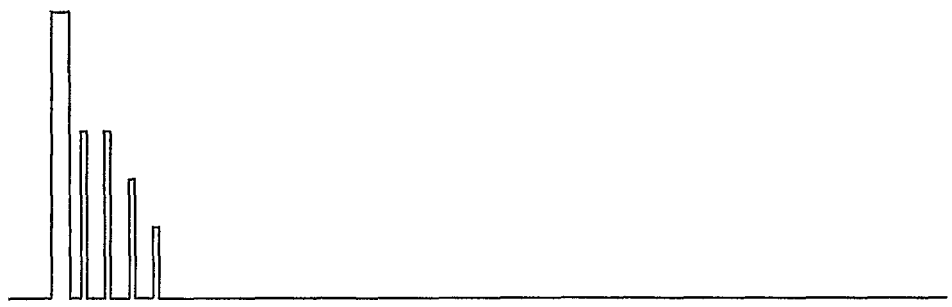
FIGS. 16a and b illustrate an encoding of binary data in the analogue protection signal.
Figure 16B:

Additionally, the first of the secondary pulses shown in FIG. 2, 3 or 6 could be used to represent binary data, leaving the presence of the rest of the signal to maintain efficacy in analogue protection schemes. This arrangement is shown in FIGS. 16a and 16b for the example signal shown in FIG. 6. In FIG. 16a, the presence of the second signal is used to represent '1', while the absence of the second pulse, as shown in FIG. 16b, represents '0'. Other pulses, or different pulses within the shape shown in FIG. 2 could also be used in this way.

The amplitude of the pulses, their timing and duration could also be used to encode the data.

Figure 17:
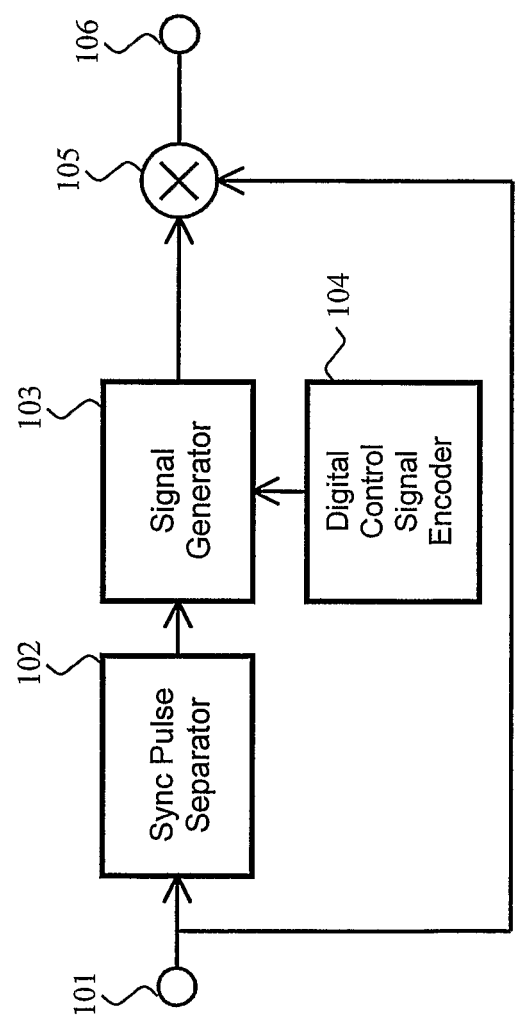
FIG. 17 is a schematic illustration of a device for generating a copy protected signal.

An apparatus will now be described for adding the copy protection signals described above, with reference to FIG. 17.

An unmodified video signal is firstly received at input 101. The video signal is passed from the input to synchronisation pulse separator 102, which is arranged to detect the line synchronisation pulses and provide an output to protection signal generator 103, indicating the timing of the pulses. This timing may be taken from the leading edge of the synchronisation pulse for example.

Protection signal generator 103 is arranged to receive the output from the synchronisation separator and to generate one of the protections signals described above. Furthermore, protection signal generator receives an input from digital control signal encoding block 104. This input will be in the form of a bit or bits of information. In response to this the signal generator produces a modified protection signal giving analogue protection as well as encoding a bit of digital control signal data. This is then output at the desired timing to mixer 105 which mixes the protection signal with the unmodified video signal received from the input 101 to form a modified copy protected video signal. The modified video signal is then passed to the output 106.

Figure 18:
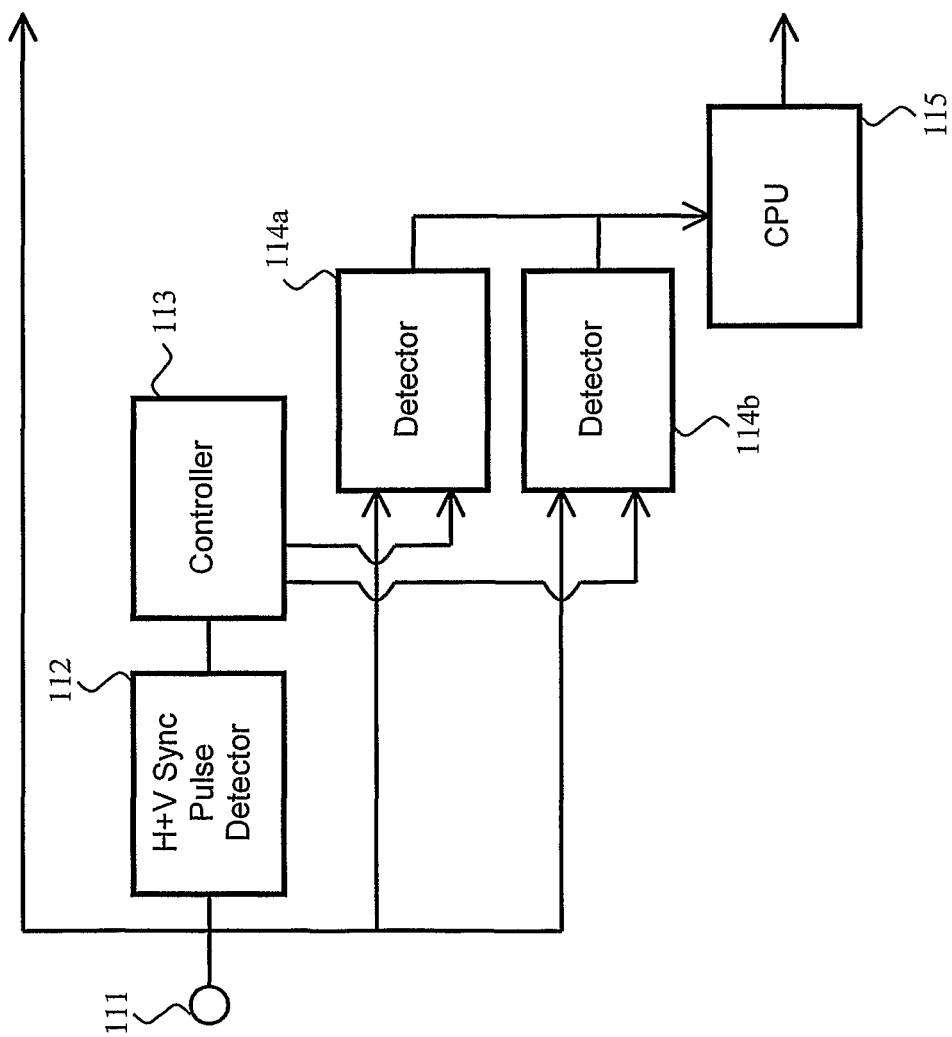
FIG. 18 is a schematic illustration of a device for detecting digital control signals in an analogue protected signal.

A detector will now be described with reference to FIG. 18, for detecting the digital control signals and for taking action depending on the signals received. It will be appreciated that is preferably installed in a digital recording device.

Protected signal is received at input 111, and passed to Horizontal and Vertical Sync Pulse detection circuit 112. The signal is also passed to recording circuitry (not shown). Horizontal and Vertical Sync Pulse detector generates a timing signal based on the timing of the synchronisation pulses in the video signal and passes the timing signal to controller 113. Controller 113 uses the timing signal as the basis for controlling individual detectors 114a, 114b each of which is arranged to detect one of the different analogue protection signals described above. Each detector therefore also receives the protected signal from input 111. The controller activates each detector at the appropriate time to detect a pre-determined one of the signals. The detectors 114a, 114b may comprise frequency or voltage detectors as is known in the art. Although only two detectors are shown, this is only a schematic illustration, and it will be appreciated that the detection circuitry will comprises as many circuits as necessary to detect all of the possible combinations of signal.

The detectors are preferably arranged to give an output, which is either a zero or a one depending on the signal received, to CPU 115. Whether the signal is interpreted as a zero or as a one, will depend on the digital control signal encoding used, and will need to be established before transmission of the protected signal occurs.

CPU processes the digital signal using a look up table similar to that shown in FIG. 15, which is stored in memory for reference. The CPU therefore determines what digital control signal has been received and gives an output to the recording circuitry controlling its operation. Depending on the control signal received, the recording circuitry may be prevented from operating, or may be allowed to record the video program with certain restrictions, such as imposing a limited storage period, or the inclusion of license information.

A system for modifying a copy protected video signal so that it can be recorded by a video recorder will now be described with reference to FIG. 19. This involves removing the protection signal and restoring the colour burst, or otherwise restoring the colour burst and line synchronisation pulse to the standard form, shown in FIG. 1.

Figure 19:
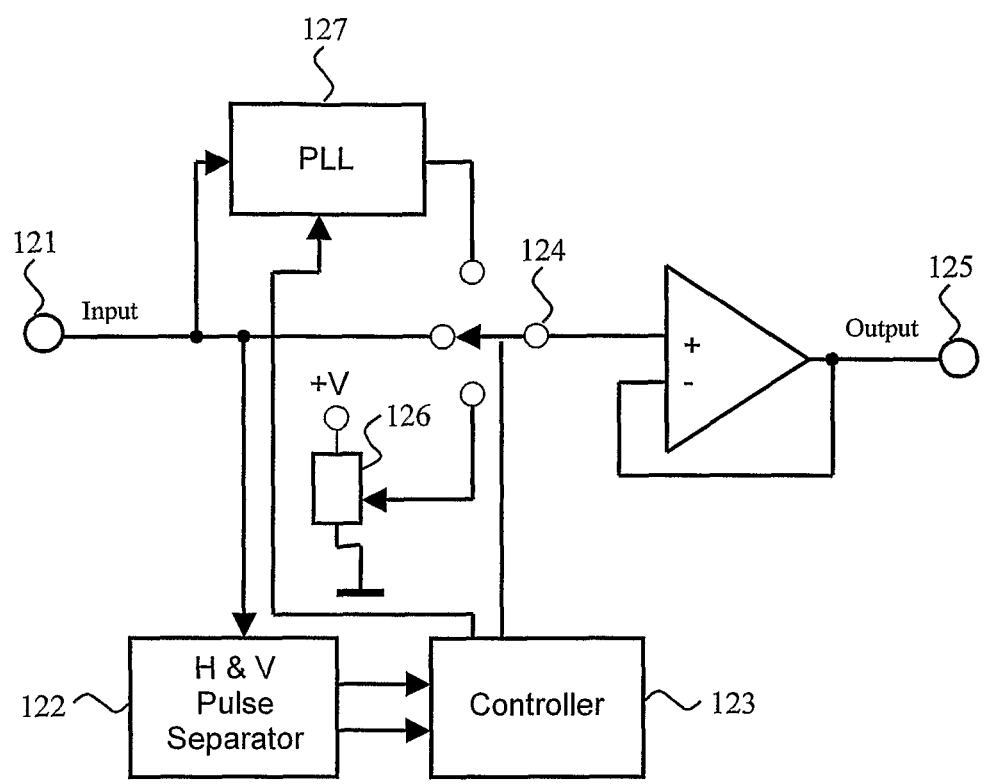
FIG. 19 is a schematic illustration of a circumvention device for removing one or more of the analogue or digital protection signals from a protected video signal.

FIG. 19 shows a block diagram of an apparatus for circumventing the copy protection signal. The copy protected signal is received at input 121, and passed to Horizontal and Vertical (H&V) Sync Pulse separator 122. The Horizontal and Vertical (H&V) Sync Pulse separator 122 separates the horizontal and vertical synchronization pulses of the copy protected video signal to generate a timing signal which is provided to the controller 123. Such devices are known in the art and so will not be described further here. The controller uses this timing information to generate gating signals which correspond to the timing of the horizontal synchronisation pulses, the line blanking interval and the colour burst.

Switch 124, connects output terminal 125 either to input 121 or voltage generator 126 respectively. Based on the gating signals, the controller controls switch 124 so that either the input video signal or the voltage generator is connected to the output 125 of the circumvention device. The voltage generator is connected to the output when a modified synchronisation pulse or line is to be restored to an unmodified form. The controller controls the voltage generator accordingly to generate a 0V blanking level signal or a synchronisation pulse peak level, typically −300 mV in the PAL system so that the correct waveforms can be reconstructed.

The controller also controls Phase Locked Loop 127 based on the gating signals. This is used to detect the modified colour burst part of the signal. The phase locked loop is arranged to have a short time constant so that it can lock to the original, unmodified subcarrier frequency of the colour burst portion, despite the modifications that have been made during the protection process. The phase locked loop is therefore similar to that used in television receivers that are able to lock onto the colour burst of the modified copy protected signal before recording.

The phase locked loop also generates an output oscillation at the subcarrier frequency, and can be switched into the circuit by the controller so that it is connected to the output based on the gating signals. In this way the colour burst of the signal can be reconstructed.

Once this has been done, the output signal is no longer protected against recording on analogue or digital recorders. If desired, an analogue copy protected signal can then be re-generated using circuitry like that shown in FIG. 10.

The above method relies on smoothing away the part of the signal that has been modified and reconstructing it. Alternatively, the circuit in FIG. 19 could comprises a pulse or signal generator for adding a waveform to the video signal that exactly cancels the protection signals added during the protection process. The circuitry for this is identical to that in FIG. 10 but adds signals with the opposite polarity or sign to cancel the protection effects.

In the case of digital recorders, the simplest circumvention technique is to insert data into the signal to indicate directly that copying is permitted. This may be achieved with a combination of the detector circuitry and the encoding circuitry illustrated in FIGS. 17 and 18. Once a digital control signal has been detected that indicates copying is not allowed or is restricted, the signal is simply recorded with that part of the signal replaced by the copy authorised '0000' signal.

Although, an apparatus has been described for adding the protection signal, detecting the protection signal and for circumventing the signal, it will be appreciated that this could take the form of a computer or signal processor on which the appropriate software has been installed. In this case, the separate blocks described may be thought of as corresponding to software processes. A combination of software and hardware elements could also be used.

The specific examples are illustrations of various embodiments of the invention and are not therefore intended to be limiting. Those skilled in the art will understand that there are many other ways of performing the invention within the scope defined by the claims.

One alternative embodiment involves switching between two protection signals, such as the two alternatives presented above every 6 seconds.

In particular, the amplitudes referred to in the description are in accordance with the positive transmission scheme employed in PAL and NTSC. It will be appreciated that the invention could also be used however with negative transmission schemes.

Additionally, it may be desirable to tailor the protection that is added according to the type of television receiver on which it is to be displayed. This will be useful when the protection apparatus is installed in a digital set top box to ensure that the receiver is able to deal with the modifications made to the colour burst and back porch without loss of playability. To achieve this the apparatus shown in FIG. 17 may also comprise a receiver model specifying parameters for the protection signal used, when a receiver type is given as an input.

The invention claimed is:

1. An apparatus for modifying a video signal comprising:
an input for receiving an analog video signal of the type having horizontal synchronisation pulses and in which colour information is transmitted on a subcarrier signal, the video signal having a colour burst comprising a subcarrier signal at a reference frequency which is used to generate a reference subcarrier signal in the receiver for demodulating the colour information, and wherein the phase of the colour subcarrier in the video signal, when compared with the horizontal synchronisation pulse, is substantially different on every line, the apparatus comprising;
a signal generator arranged to add a protection signal to the video signal in the vicinity of the colour burst, such that upon recording of the video signal by a video cassette recorder the protection signal interferes with the operation of the video cassette recorder causing errors in the colour burst recorded, wherein the signal generator is arranged to add 6 cycles of protection signal to the video signal, the amplitudes of the first two cycles being different to those of the last four cycles, wherein the signal generator is arranged to generate the protection signals having a peak to peak amplitude of oscillation in the range 10 mV to 750 mV, wherein the signal generator is arranged to add five pulses between a line synchronisation pulse and the colour burst of the input video signal, and wherein the signal generator is arranged to generate pulses of decreasing amplitude;
an output for outputting a modified video signal comprising the video signal and the protection signal, wherein when the modified video signal has been recorded by a video recorder, playback of the modified video signal exhibits visual artefacts that are not visible before recording of the modified signal occurred, and
wherein the signal generator is configured to add the protection signal to the video signal such that the protection signal is phase-locked to the horizontal synchronisation pulse and such that the protection signal has a frequency that is substantially similar to the colour subcarrier, and wherein the signal generator is configured to add the protection signal such that it interferes with the colour killer circuits of a video cassette recorder.

2. The apparatus of claim 1, wherein the signal generator is configured to add the protection signal such that at least part of the waveform overlaps with the colour burst.

3. The apparatus of claim 1, wherein the signal generator is arranged to generate a protection signal comprising a number of cycles.

4. The apparatus of claim 3 wherein the signal generator is arranged to generate a protection signal having a frequency in the range 3.5 MHz to 5.5 MHz.

5. The apparatus of claim 3, wherein the protection signal varies in amplitude over respective cycles.

6. The apparatus of claim 5, wherein the amplitude of the leading cycles of the protection signal is lower than that of the subsequent cycles.

7. The apparatus of claim 1 to comprising means to reduce the amplitude of the colour burst in the modified video signal from that of the video signal received at the input.

8. The apparatus of claim 1, wherein the signal generator is arranged to generate a second protection signal, different to the protection signal, and to vary the protection signals on different lines of the video signal or on different groups of lines, or different frames.

9. The apparatus of claim 8, wherein the second protection signal comprises only cycles of constant amplitude.

10. The apparatus of claim 1 wherein the video signal is a PAL signal.

11. The apparatus of claim 1, wherein the amplitude of the cycles below a zero volt level is smaller than a waveform above the zero volt level.

12. The apparatus of claim 1, wherein the signal generator is arranged to generate a protection signal in which a peak-to-peak amplitude of the first 2 cycles is in the range 10 mV to 300 mV, and the amplitude of the last four cycles is in the range 10 mV to 600 mV.

13. The apparatus of claim 1, wherein the signal generator is arranged to add the protection signal such that the waveform is entirely contained within the colour burst.

14. The apparatus of claim 13, wherein the signal generator is arranged to generate the protection signal with an amplitude of oscillation relative to a blanking level in the range 10 mV to 400 mV.

15. The apparatus of claim 1, wherein the signal generator is arranged to add one or more pulses to the video signal between the line synchronisation pulse and the colour burst.

16. The apparatus of claim 15, wherein the signal generator is arranged to add at least one pulse into the line synchronisation pulse.

17. The apparatus of claim 15, wherein the signal generator is arranged to add at least one pulse into the colour burst.

18. The apparatus of claim 1, wherein the amplitude of the pulses ranges from 1.5V to 0.5V.

19. The apparatus of claim 18, wherein the signal generator is arranged to vary heights of the pulses generated, and timings of the pulses generated between successive lines of the signal.

20. A method for modifying a video signal comprising:
receiving a video signal of the type having horizontal synchronisation pulses and in which colour information is transmitted on a subcarrier signal, the video signal having a colour burst comprising a subcarrier signal at a reference frequency which is used to generate a reference subcarrier signal in the receiver for demodulating the colour information, and wherein the phase of the colour subcarrier in the video signal, when compared with the horizontal synchronisation pulse, is substantially different on every line; the apparatus comprising:
adding a protection signal to the video signal in the vicinity of the colour burst, such that upon recording of the video signal by a video cassette recorder the protection signal interferes with the operation of the video cassette recorder causing errors in the colour burst recorded, wherein adding the protection signal comprises adding 6 cycles of protection signal to the video signal, the amplitudes of the first two cycles being different to those of the last four cycles, the protection signals having a peak to peak amplitude of oscillation in the range 10 mV to 750 mV, and wherein adding the protection signal further comprises adding five pulses between the line synchronisation pulse and the colour burst of the input video signal, the pulses being of decreasing amplitude;
outputting a modified video signal comprising the video signal and the protection signal, wherein when the modified video signal has been recorded by a video recorder, playback of the modified video signal exhibits visual artefacts that are not visible before recording of the modified signal occurred, wherein the protection signal is added to the video signal such that the protection signal is phase-locked to the horizontal synchronisation pulse and such that the protection signal has a frequency that is substantially similar to the colour subcarrier, and wherein the protection signal interferes with the colour killer circuits of a video cassette recorder.

* * * * *